United States Patent [19]
Jenkins et al.

[11] 4,221,316
[45] Sep. 9, 1980

[54] NAB TAPE CARTRIDGE ERASER AND SPLICE FINDER

[75] Inventors: John P. Jenkins, Towanda; John Fesler, Mackinaw, both of Ill.

[73] Assignee: International Tapetronics Corporation, Bloomington, Ill.

[21] Appl. No.: 884,189

[22] Filed: Mar. 7, 1978

Related U.S. Application Data

[62] Division of Ser. No. 783,303, Mar. 31, 1977, Pat. No. 4,142,221.

[51] Int. Cl.³ .................... G11B 15/29; G11B 15/18; B65H 25/32
[52] U.S. Cl. .................................... 226/35; 226/176; 242/57; 242/209
[58] Field of Search .............. 226/35, 34, 10, 43, 226/45, 176, 49, 50, 51, 188, 181; 242/188, 57, 187, 191, 57.1, 206, 209; 26/70

[56] References Cited

U.S. PATENT DOCUMENTS

| | | | |
|---|---|---|---|
| 3,217,996 | 11/1965 | Bernier | 242/188 |
| 3,854,643 | 12/1974 | Weaver | 226/35 |

*Primary Examiner*—George F. Mautz
*Attorney, Agent, or Firm*—McCaleb, Lucas & Brugman

[57] ABSTRACT

A combined eraser and splice finder for an NAB tape cartridge which comprises apparatus for subjecting an NAB tape cartridge to an initially strong and thereafter diminishing and vanishing oscillating magnetic field for bulk tape erasure and which, independently or at the termination of the erasure cycle, also senses the presence of the tape splice and stops tape travel within the cartridge at a point where subsequent recording can begin immediately behind the splice. The apparatus is capable of erasure without splice-finding or splice-finding without erasure.

9 Claims, 15 Drawing Figures

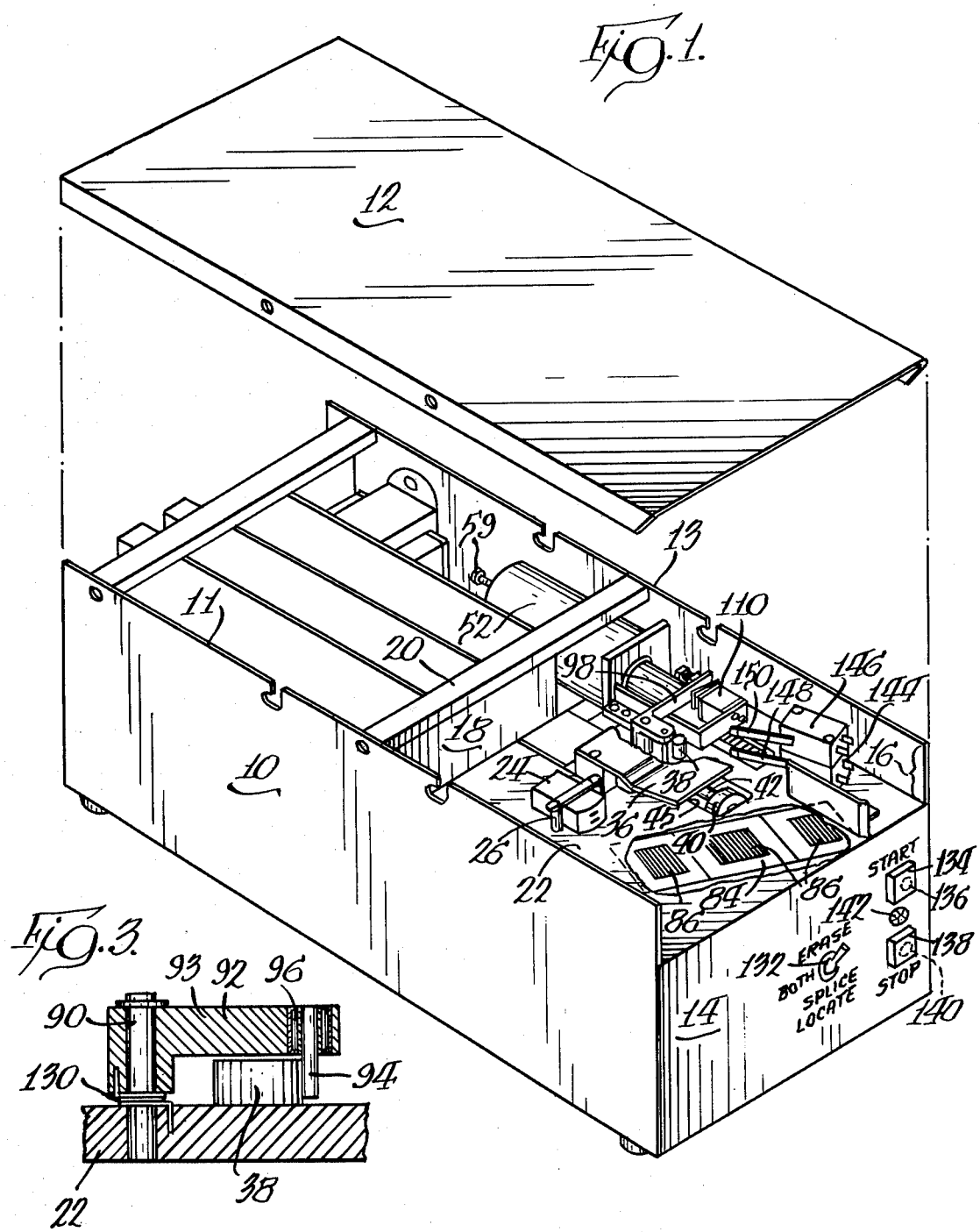

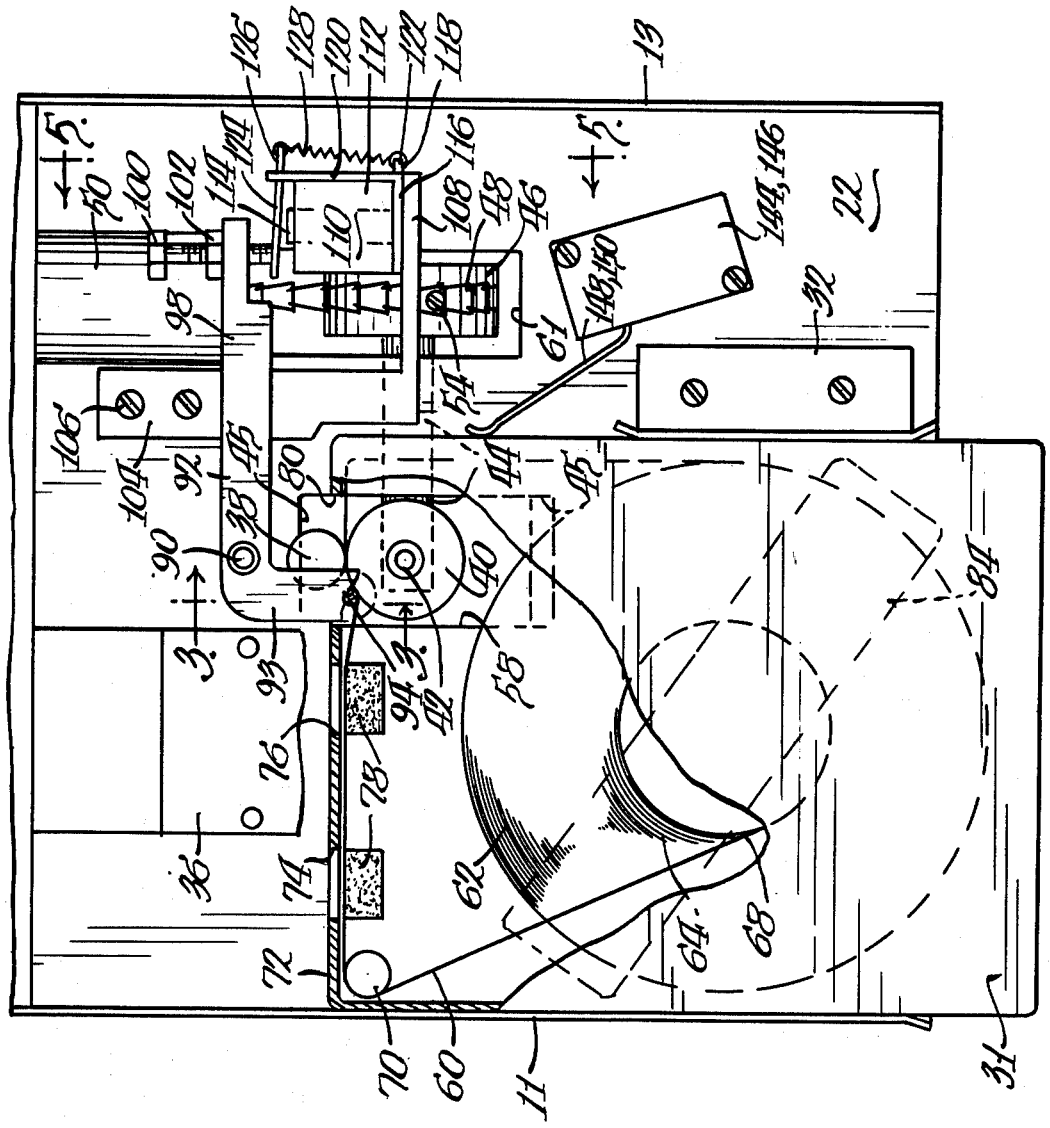

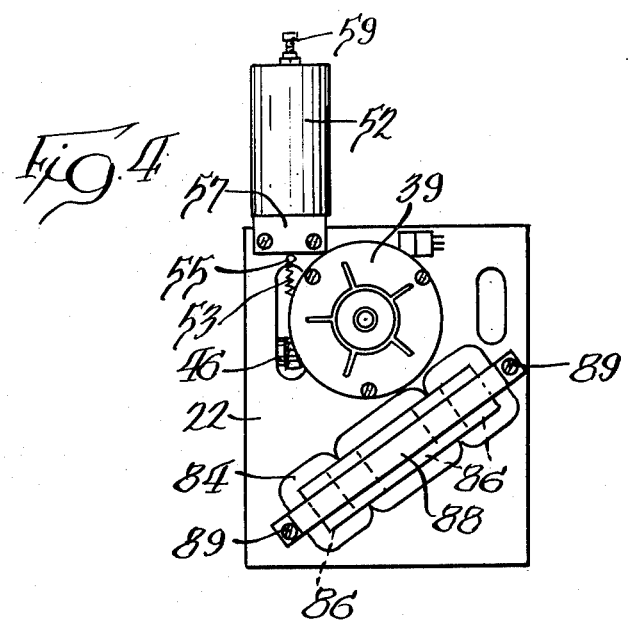
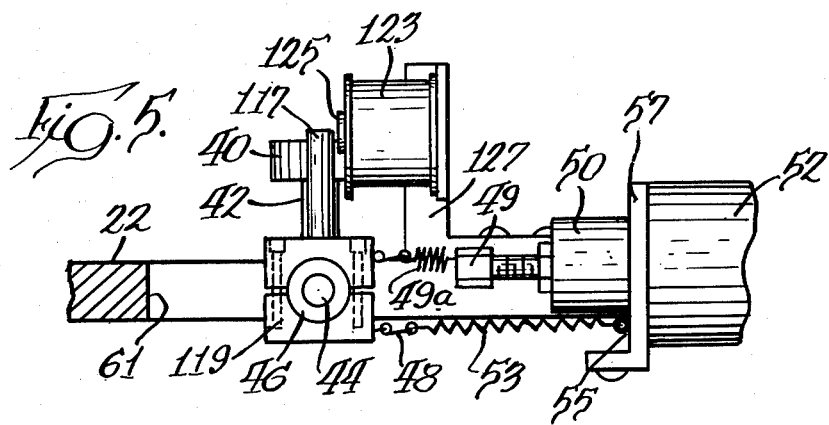
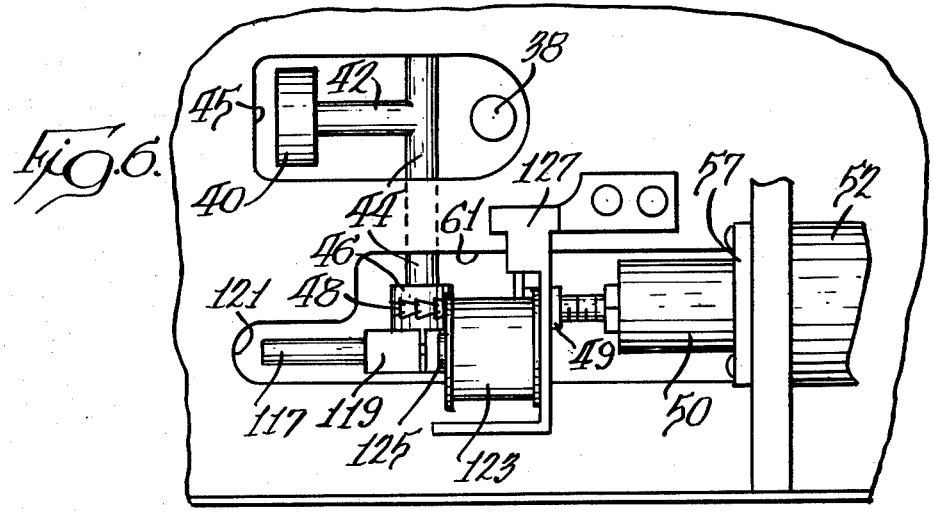

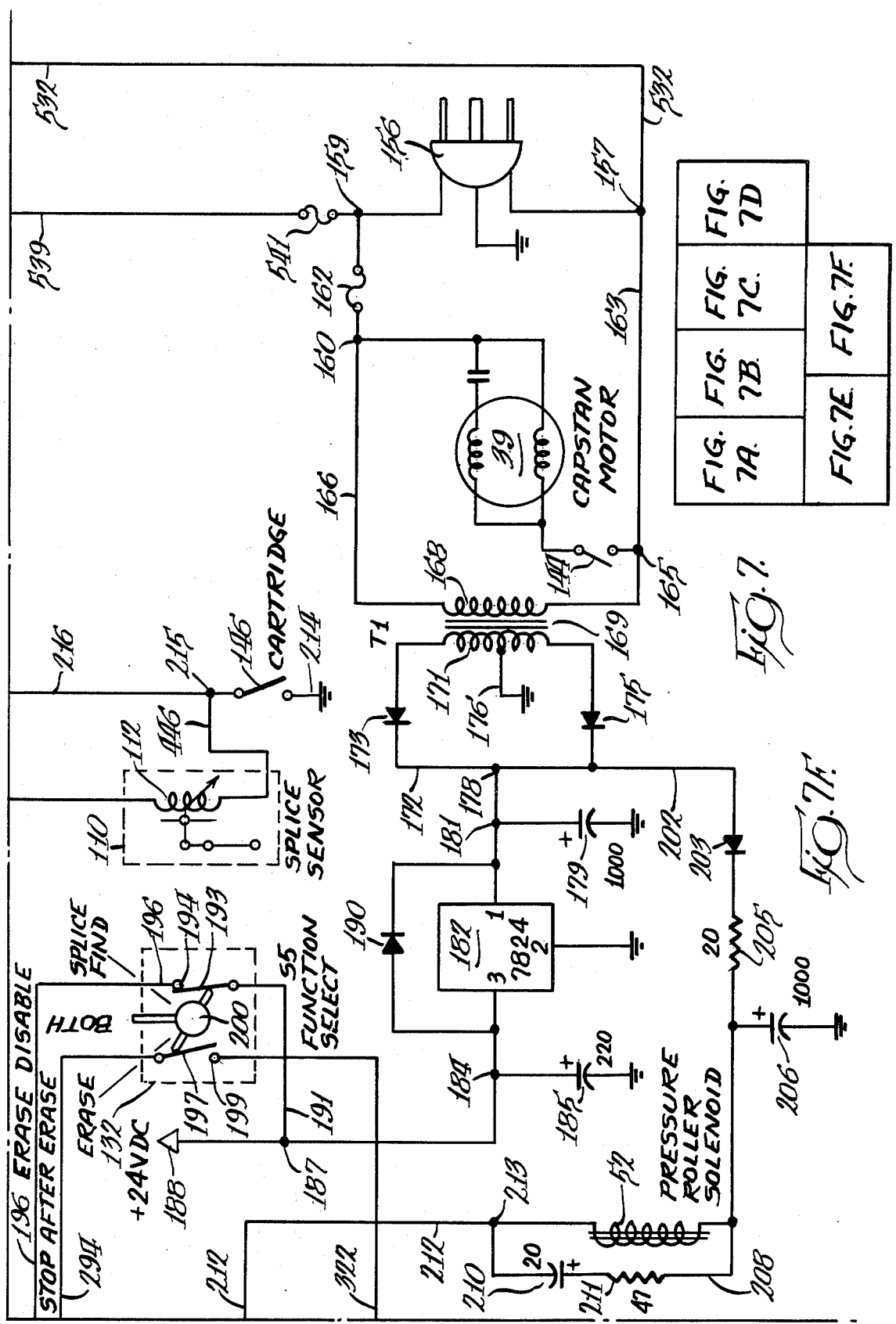

ERASER RAMP CONTROL

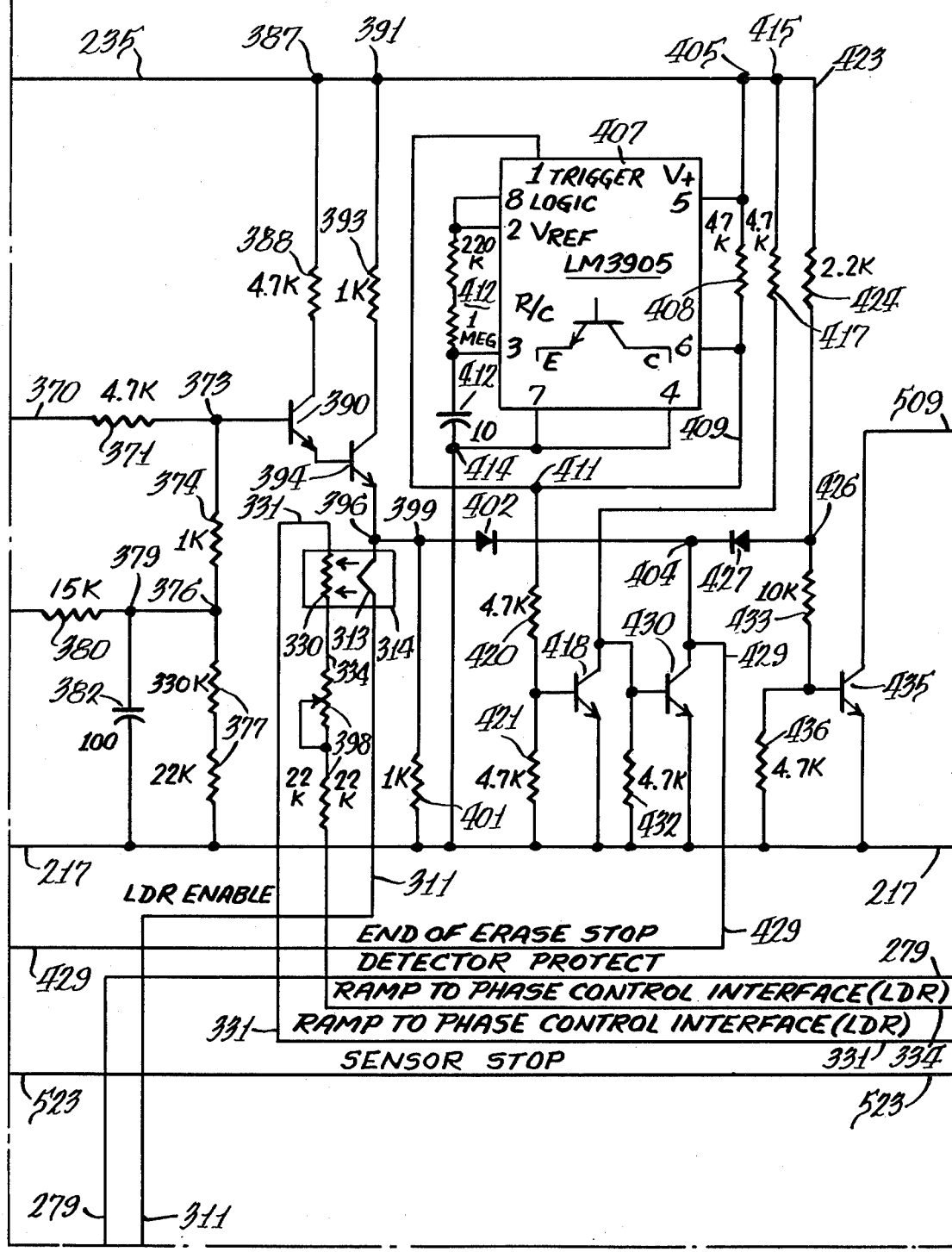
Fig. 7B. ERASER RAMP CONTROL

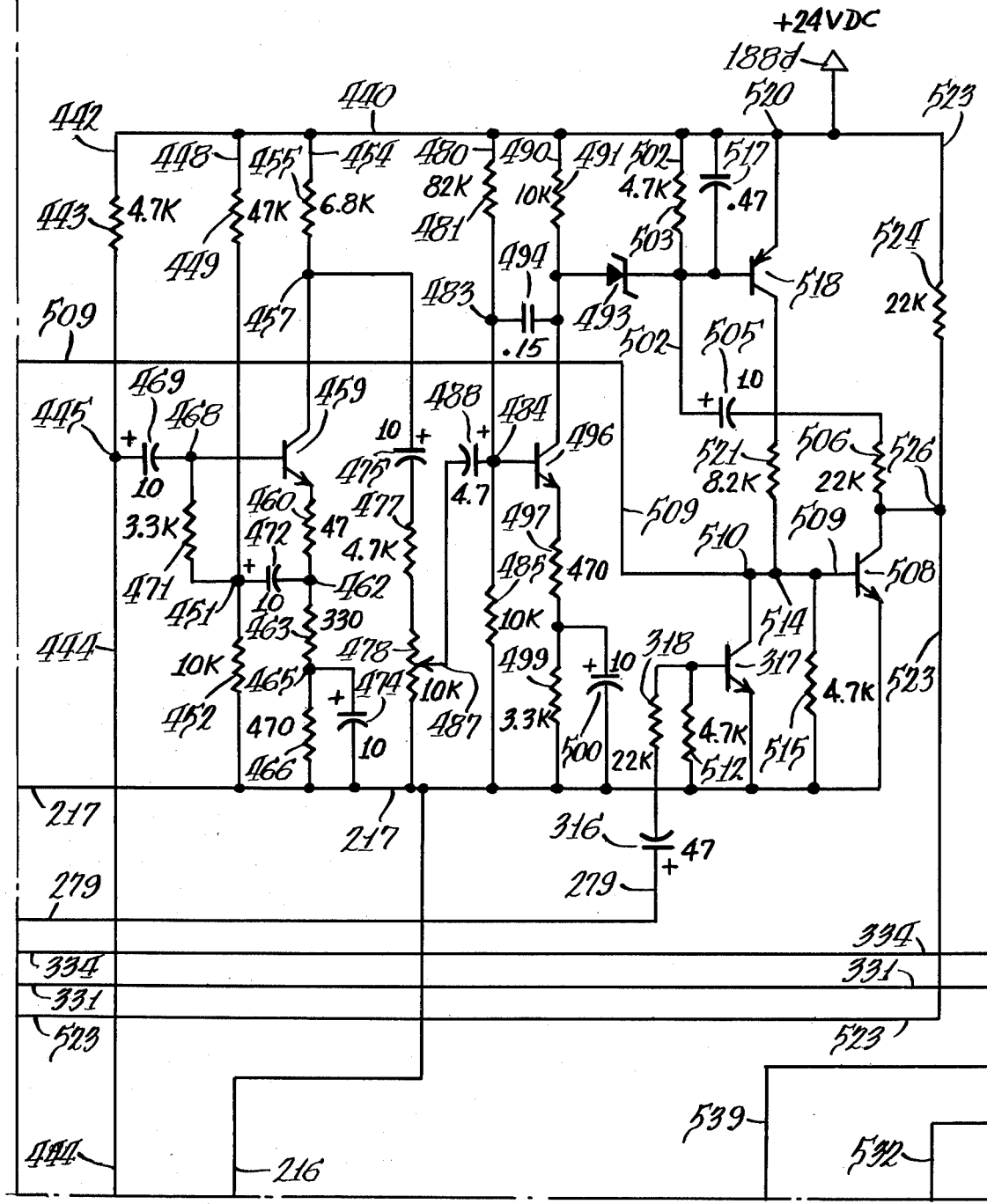
Fig. 7C. SPLICE DETECTOR

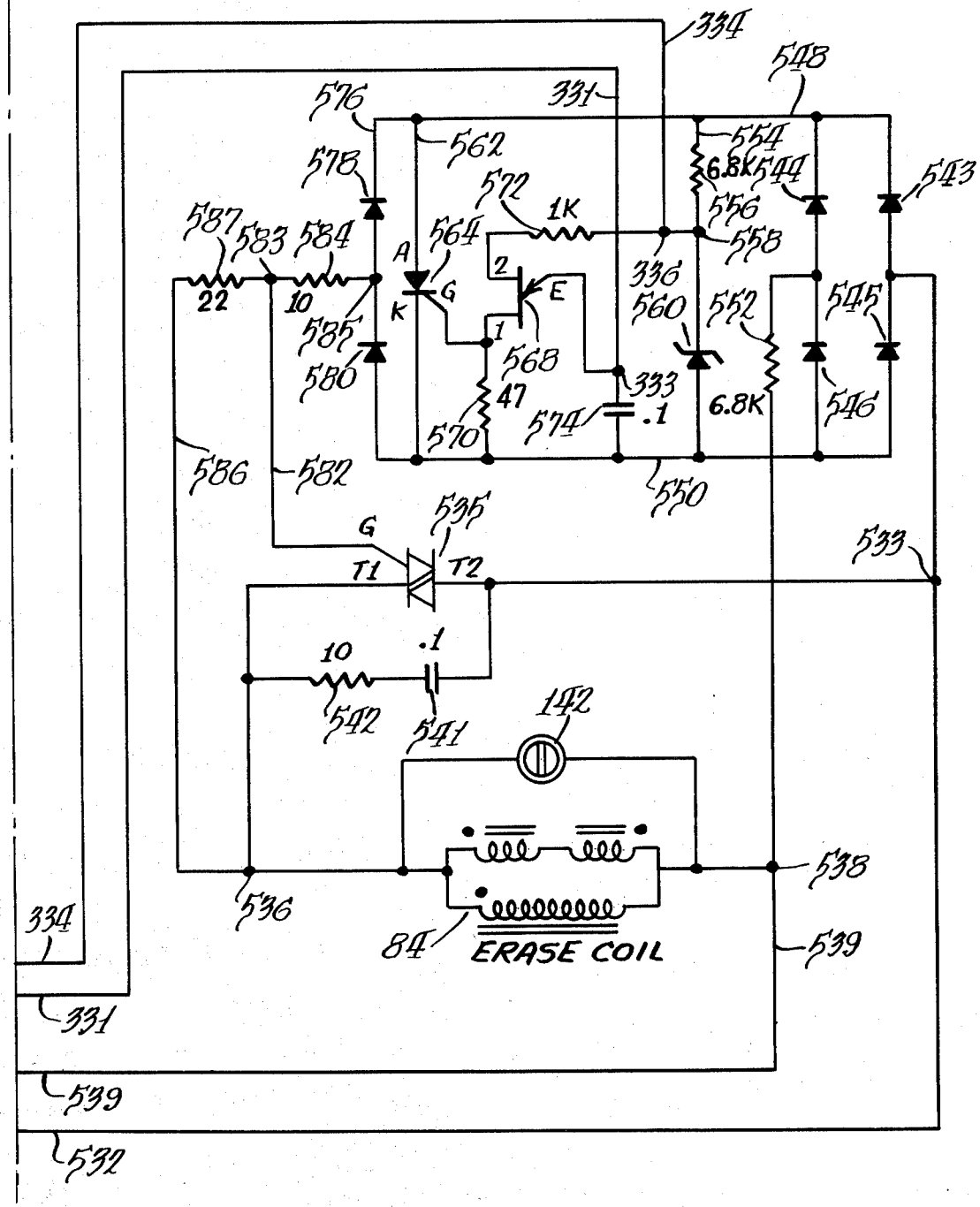

Fig. 8
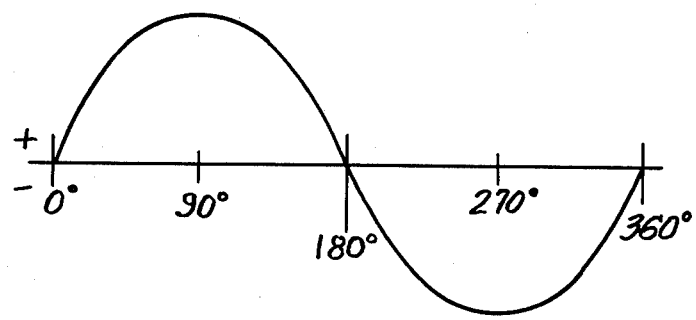
A. FULL FLUX AT START OF RAMP
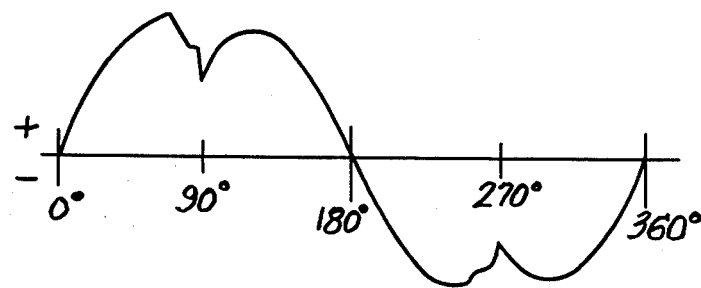
B. FLUX WAVEFORM AFTER CONCLUSION OF FAST RAMPDOWN
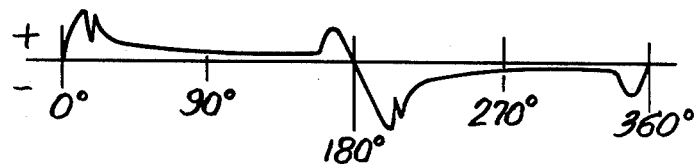
C. FLUX WAVEFORM NEAR END OF SLOW RAMPDOWN

NAB TAPE CARTRIDGE ERASER AND SPLICE FINDER

RELATED APPLICATIONS

This application is a division of application Ser. No. 783,303 filed Mar. 31, 1977, now U.S. Pat. No. 4,142,221.

BACKGROUND OF THE INVENTION

The NAB tape cartridge employs an endless loop of tape in a rectangular cartridge which contains a rotatable spool wherein the tape is drawn from the inside of the tape coil on the spool and returned to the outside thereof, the withdrawing of the tape causing a rotation of the spool to effect a rewinding of the returning tape on the outside. The tape travel runs along a straight edge of the cartridge which has three notches therein exposing the tape. Two notches are for record and playback wherein the tape is backed up by resilient pads. The third is for the capstan drive of the tape. The structure is similar to the popular 8-track cartridge except that in commercial usage, the program material is short so that a single mono or stereo track is employed, and in the 8-track cartridge, the pressure roller is integrally incorporated. The maximum tape capacity of a cartridge is about $10\frac{1}{2}$ minutes playing time at $7\frac{1}{2}$ i.p.s.

The endless loop of tape is made from a length of ordinary cartridge recording tape with its free ends spliced together with splicing tape. The splicing tape adds to the thickness and the stiffness of the recording tape at the site of the splice, and it is very difficult to splice the tape such that a drop-out of program material will not occur at the site of the splice. Because of this drop-out, the area of the splice, in commercial practice, is carefully avoided in recording whatever message may be placed on the tape.

In commercial broadcasting practice, tape cartridges must be bulk-erased prior to recording on them. Continuous erasure as with a separate erase head in the record-playback mechanism is unsatisfactory for a variety of reasons including, among others, the difficulty of fitting in an erase head, given the physical conformation of the cartridge.

The usual method of effecting bulk erasure is manually bringing an electromagnet powered typically by 60 Hz current generating a strong alternating electromagnetic field close to the cartridge for a moment and then withdrawing the magnet from the cartridge, or vice versa, slowly to a substantial distance before turning off the magnetic field. This must be performed carefully in order to avoid noise-creating residual magnetism in the tape. The procedure is time consuming and troublesome in addition to demanding considerable care and practised skill.

The customary arrangement for driving a record or playback unit is to position the tape within the cartridge immediately adjacent a constantly rotating steel capstan and, upon the record or playback signal, swing a relatively soft-surfaced, freely rotating pinch roller through the drive notch in the cartridge case against the tape to pinch it against the capstan. The soft surface effects good driving engagement for the tape without the application thereto of destructive pressure.

SUMMARY OF THE INVENTION

This invention contemplates first, an integral bulk eraser in association with a splice finder for effectively erasing tape cartridges preliminary to recording. It comprises an electromagnet situated closely adjacent the tape of a tape cartridge together with circuitry for supplying initially an alternating current to the magnet to generate a strong alternating field while at the same time running the tape within the cartridge so as to expose all of the tape to the influence of the field, and thereafter gradually diminishing the current applied to the magnet such that the field decays to disappearance. In this fashion, proper, uniform, and error-free erasure is assured.

Another feature of this invention is the provision of a splice finder which performs in conjunction with a conventional transport mechanism and is designed to be incorporated therein and which, therefore, permits the use of the conventional soft pinch roller for driving the tape.

The sensing mechanism and transducer may take either of two forms. In one form, a freely rotating shaft is supported by a lever to engage the tape on the periphery of the pinch roller a short distance away from the capstan-pinch roller engagement. When the splice is encountered, the lever moves, and the end thereof remote from the shaft reduces the gap in the core of a magnetic circuit to effect a pulse in the current in the circuit generating the field.

In the other form, a permanent magnet associated with the pinch roller is positioned near a coil when the pinch roller is pinching the tape against the capstan. When motion is imparted to the pinch roller shaft by the passage of a splice, a current is generated in the coil.

In both cases, the signal is transmuted by electronic circuitry to cause an immediate drop-out of the pinch roller. The circuitry includes provision to prevent a triggering when the pinch roller is first brought to bear on the tape. When the operation of the splice finder is integrated with the bulk eraser, provision is made to delay operation of the splice finder until the erase cycle is completed.

Attention is directed to U.S. Pat. No. 3,854,643 to Weaver dated Dec. 17, 1974 and entitled "Splice Finder." That patent discloses a similar apparatus with, however, some notable limitations. First, it lacks any showing of a diminishing field for erase purposes. Second, splice detection is based on movement imparted to the pinch roller by passage of a splice. However, the parts directly connected to the pinch roller and movable therewith are relatively massive in toto. To obtain an abrupt movement of the pinch roller, therefore, a relatively hard roller must be employed which is destructive of the tape, or at least, for a roller of conventional softness, a less positive pulse will result.

BRIEF DESCRIPTION OF THE DRAWINGS

FIG. 1 is an isometric view of a NAB tape cartridge transport incorporating the bulk eraser and one form of splice finder of this invention;

FIG. 2 is an enlarged top plan view of the right hand end of the transport of FIG. 1;

FIG. 3 is an enlarged section through one arm of the splice detector lever taken substantially along the line 3—3 of FIG. 2 looking in the direction of the arrows;

FIG. 4 is a plan view of the under side of the deck of FIG. 2;

FIG. 5 is a side elevation of the second form of splice sensor, shown in splice-sensing position, and may be generally regarded as being taken from the line 5—5 of FIG. 2, looking in the direction of the arrows;

FIG. 6 is a top plan view of the mechanism of FIG. 5 showing it in its inactive position;

FIGS. 8A, B and C are a series of graphs illustrating the waning of the erase field.

DESCRIPTION OF A PREFERRED EMBODIMENT

I. Mechanical Characteristics and Operation

Figure 7A:
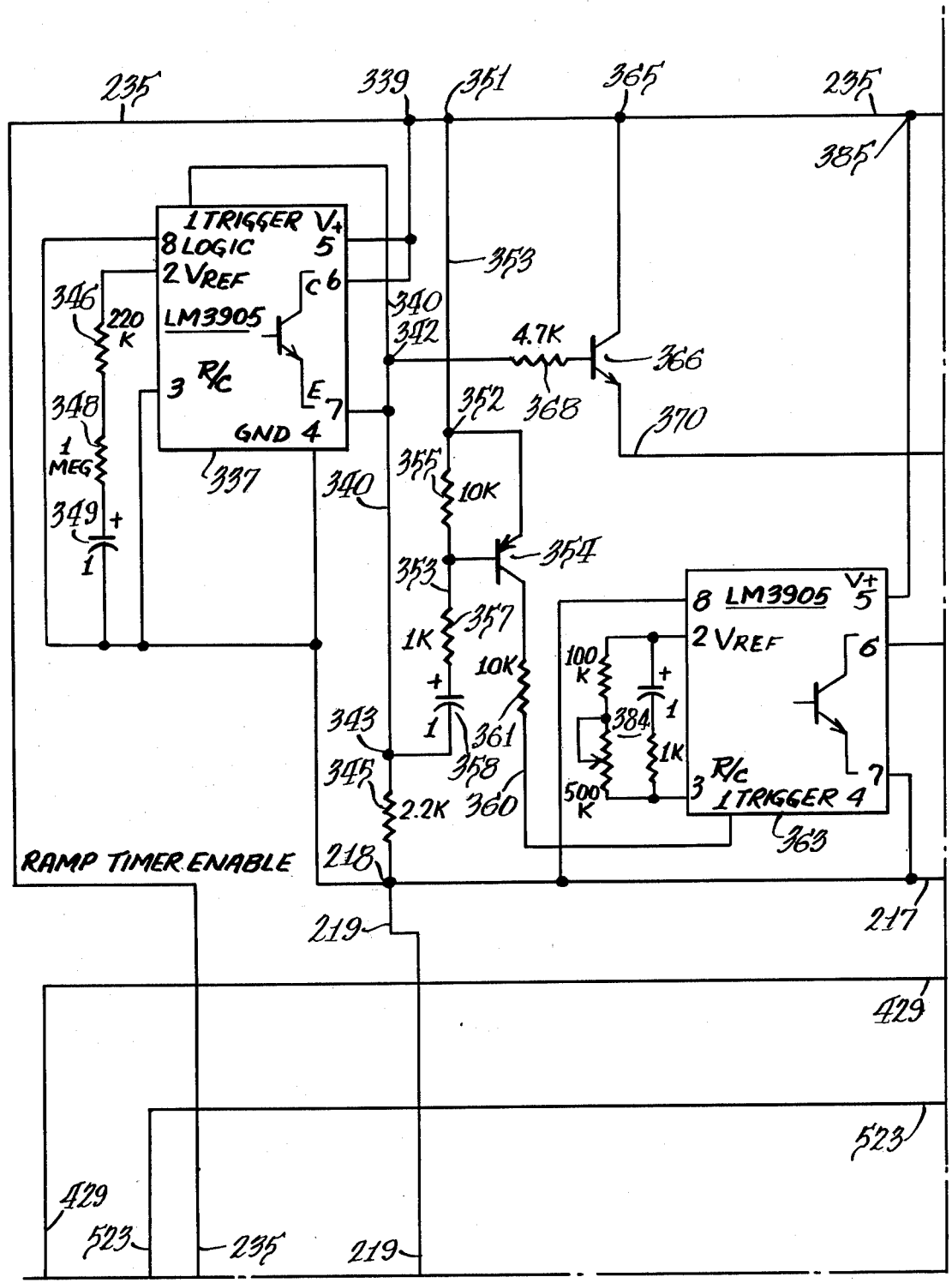
FIG. 7 is a circuit diagram for the splice finder and bulk eraser of the present invention; the diagram being divided, as shown among sections A, B, C, D, E, and F.

FIG. 1 illustrates a NAB tape cartridge transport incorporating the present invention. It consists of a rectangular case 10 having side walls 11 and 13 and a cover 12. The front wall 14 of the case 10 terminates well below the cover 12 so as to define a slot 16 for the insertion of a tape cartridge. The case 10 is divided vertically transversely by an internal wall 18 and a top brace 20. To the front of the wall 18, an aluminum horizontal floor 22 is provided having its top surface aligned with the top edge of the front wall 14 to be a floor for the slot 16 and to support the operating elements of the transport.

A guide 32 spaced a cartridge's width from side wall 11 is situated within the slot 16 to direct the cartridge correctly into the unit between it and the side wall 11. A zig-zag hold-down spring 36 is secured to the floor 22 at one end so that the other end bears against the top of the cartridge to hold it to the floor 22.

A capstan 38, direct-driven by a 1,750 rpm motor 39 mounted to the underside of the floor 22, extends up through the floor to be positioned adjacent to an exposed area of the tape when the cartridge is properly seated within the transport. The capstan diameter is such as to achieve a surface speed of 25–29 inches per second. The motor mounting is adjustable in a fore-and-aft direction to attain the proper relation with the pinch roller 40.

The pinch roller 40 is freely rotatably mounted on an axle 42 which in turn is mounted on the cylindrical periphery toward one end of a cross shaft 44 journalled within the thickness of the floor 22. The cross shaft has a sleeve or chain pulley 46 secured thereto at its other end. The pinch roller 40 and its axle are contained in an appropriate cut-out 45 in the floor 22 such that the pinch roller may be recessed below the floor or swung up above the floor into engagement with the capstan 38.

A chain 48 is adjustably connected at one end to a screw 49 threaded into the plunger 50 of a pressure roller solenoid 52, and is entrained over the pulley 46 and connected at its other end to a spring 53 which in turn is moored in tension to a stationary point 55 on the under side of the floor 22 approximately under the solenoid 52. Solenoid 52 is secured to the floor 22 by a bracket 57. A screw 54 extends through a link of the chain into the pulley 46 to fix the position of the chain relative to the sleeve 46. The plunger 50 and pulley 46 operate within a second cut-out 61 in the floor 22.

When the solenoid 52 is deenergized, the spring extends the plunger 50 and rotates the sleeve 46 and cross shaft 44 to a position where the pinch roller shaft 42 is horizontal and extending toward the front of the machine and the pinch roller is recessed below the top surface of the floor 22. When the solenoid 52 is energized, the plunger is retracted and the shaft 42 of the pinch roller is rotated through 90° against the force of the spring to carry the pinch roller up above the floor 22 and into contact with the capstan drive 38. The adjustability of the screw 49 and the fore-and-aft adjustability of the capstan motor 39 provide a precisely square meeting between the capstan and the roller coincident with the bottoming of the solenoid plunger 50. Cut-out 45 in the floor 22 and an analogous window 58 in the underside of the tape cartridge 31 are provided to permit the movement of the pinch roller.

The solenoid includes an internal pneumatic damper or dash pot externally adjustable by needle valve 59 to the rear of the solenoid to cushion the bottoming of the plunger.

The tape cartridge 31 is a rectangular box with a rotatable reel 62 nearer one end of the box than the other. The tape 64 is coiled on the reel, and a continuous bight or loop 60 thereof is drawn from the inside of the coil at point 68, travelling around a guide 70 to direct the tape narrowly inside the remote edge of the case. The remote edge has windows 74 and 76 through which the record and playback heads would normally make contact with the tape, the tape being backed up by resilient pads 78 opposite the heads. A third window 80 in the edge 72 continuous with window 58 in the side exposes the tape for direct contact with the capstan 38. A combined guide and brake receives the tape at the opposite corner of edge 72 and directs the loop back to the reel 62 to wind on the outside of the coil 64.

The apparatus as thus far described is generally conventional.

The mechanical additions to the apparatus by which the erase and splice finding functions are accomplished are as follows. An E-core coil 84 on parallel, aligned ferromagnetic legs 86 of the core is secured to the under side of the floor 22 by a flat strap 88 extending lengthwise across the under side of the coil and by long bolts 90 running through the ends of the strap and screwed into the under side of the floor 22. The free core ends are upward against the under side of the floor. The direction of winding on the core legs is such that the flux lines in the outer legs will be opposite in direction to the flux lines in the center leg, so creating two parallel flux circuits in a figure eight configuration. The coil lies diagonally crosswise of the cartridge case and underlies the reel 62 on which the tape is wound so that the flux lines of the coil extend upwardly through the floor and into the tape cartridge to expose the tape on the coil to a flux concentration. The flux field in the vicinity of the tape loop 66 will be considerably attenuated.

The remainder of the mechanical additions relate to the splice finder.

In the first form of splice finder (FIGS. 1, 2, and 3), a post 90 is press-fitted into an appropriate bore in the floor 22 immediately to the rear of the capstan 38. The post serves as a fulcrum for an L-shaped lever 92. The lever includes a short arm 93 extending partially over the capstan 38, that arm of the lever being recessed sufficiently on its under side to permit such overlap. At its outer end, the short arm 93 mounts a freely rotatable dependent shaft or feeler 94 adjacent the front facing surface of the capstan 38. The feeler is mounted in bearings 96. The long arm 98 of the lever is at a right angle to the short arm 93 and extends transversely of the case 10 toward the chain pulley 46. The long arm has a forwardly directed machine bolt 100 extending through its end with a lock nut 102 on it.

A bracket 104 is mounted to the floor 22 beside the pinch roller solenoid plunger 50 as by screws 106. An arm of the bracket 108 extends across the pulley 46 and supports the splice detector sensor 110. The sensor consists of a coil 112 on a ferromagnetic core 114. The base 116 of an L-shaped frame 118 is secured to one end of the coil 112 in contact with the core 114 on its inside and on its outside to the arm 108 of the mounting bracket 104. The side 120 of the frame extends alongside the coil and beyond the other end of the coil. An ear 122 extends outwardly from the intersection of the base 116 of the frame and the side 120 thereof. A metal flap 124 is mounted in a notch in the free remote edge of the side 120 of the frame 118 to extend across the end of the solenoid core 114 protruding from the other end of the core. This mounting of the flap permits pivotal movement thereof. The flap has an ear 126 extending from the mounted edge thereof and a light coil spring 128 connects ears 122 and 126 so as to bias the flap away from the core 114. The flap is positioned to intercept the machine screw 100 in the long arm 98 of the lever 92. The core 114, the frame 118, and the flap 124 define a ferromagnetic flux path with a variable gap therein (flap to core), variation of which will alter the reluctance of the coil.

A light spring 130 encircles the post 90 and has one end received in an appropriate bore in the floor 22 and its other end in an appropriate bore in the bottom of the lever 92 adjacent the post 90 so as to bias the lever with light resilient pressure in a counterclockwise direction as seen in FIG. 2.

When a tape cartridge is inserted into the machine and the pinch roller 40 brought up into driving position on the tape against the capstan 38, the spring 130 urges feeler 94 also to contain the tape against the pinch roller. When splice sensing is desired, a direct current will be applied to the coil 112 of the sensor 110. The sensor 110 has a certain reluctance value established by the open magnetic flux path of the sensor core 114, the frame 118, and the flap 124 which will have a normal spacing from the protruding end of the core 114, as illustrated.

When a splice passes between the pinch roller 40 and the feeler 94, the increased thickness will pivot the lever 92 about post 90. The long arm 98 of the lever will magnify this movement, and the screw 100 will pivot the flap 124 to or toward the protruding end of the armature 114. The screw 100 is so set as to cause the flap to approach very closely the core under splice-detecting circumstances to obtain a prominent change in reluctance. The approach of the flap to the core momentarily increases the inductive reactance of the coil 112 and introduces a pulse into the energizing current of the coil.

The second form of splice detector sensor is particularly illustrated in FIGS. 5 and 6. This form depends directly on the movement imposed on the pinch roller 40 as a splice passes between it and the capstan 38. In this form, a short coil spring 49a is interposed between the chain 48 and the clevis screw 49, and a permanent bar magnet 117 is attached at one end to a square clamp 119 which is clamped to the chain pulley 46 beside the chain 48. The bar magnet will be approximately parallel to the pinch roller axle 42. Thus, it will move with the pinch roller axle between a horizontal, recessed position, the cut-out 61 being enlarged as at 121 to accommodate the magnet as illustrated in FIG. 6, and an upstanding vertical position as shown in FIG. 5. A coil 123 having a core 125 is supported by a bracket 127 screwed to the floor 22 so that the free end of the permanent magnet 117 approaches very closely the exposed end of the core 125 of the coil 123 when it is in its vertical position of FIG. 5, the pinch roller 40 then being in driving relation with the capstan 38. Thus, the coil 123 and the core 125 inductively magnetized by the permanent magnet 117 constitute a voltage generator. Any change in the flux in the core 125 occasioned by movement of the permanent magnet 117 away from the core 125 such as would occur in the passage of a splice between the pinch roller 40 and capstan 38 would generate a voltage pulse within the coil 123.

It will be noted that the mass of the pinch roller assembly is very low and axially concentrated to give a very low inertia. The permanent magnet is short, slender, and lightweight. It is thus very sensitive to the passage of a splice.

The cabinet has certain external controls on its front face: a three position toggle MODE switch 132 indicating an ERASE function at its upper position, a SPLICE LOCATE function at its lower position, and both functions at its center position; START switch 134 having an indicator RUN lamp 136 therein; a STOP switch 138 having an indicator READY lamp 140 therein; and an ERASE indicator lamp 142.

A pair of microswitches 144 and 146 having feelers 148 and 150 respectively are mounted in stacked relation on the table 22 in front of the splice detector sensor 110 with the feelers in a position to intercept the cartridge case as it is placed into the machine to close their associated switches.

Closing of the lower microswitch 144 actuates the capstan motor 39 and closure of the upper switch 146 readies the electronic circuitry for operation and illuminates th READY lamp 140 within the STOP switch 138. When the START switch is pushed, the RUN light 136 within it is illuminated and the READY lamp 140 is turned off. The ERASE indicator lamp 142 is energized when the erase field is present. The intensity of the lamp is proportional to the strength of the erase field so that waning of the strength of the field can be visually followed.

II. Electrical Circuit and Operation

Figure 7E:
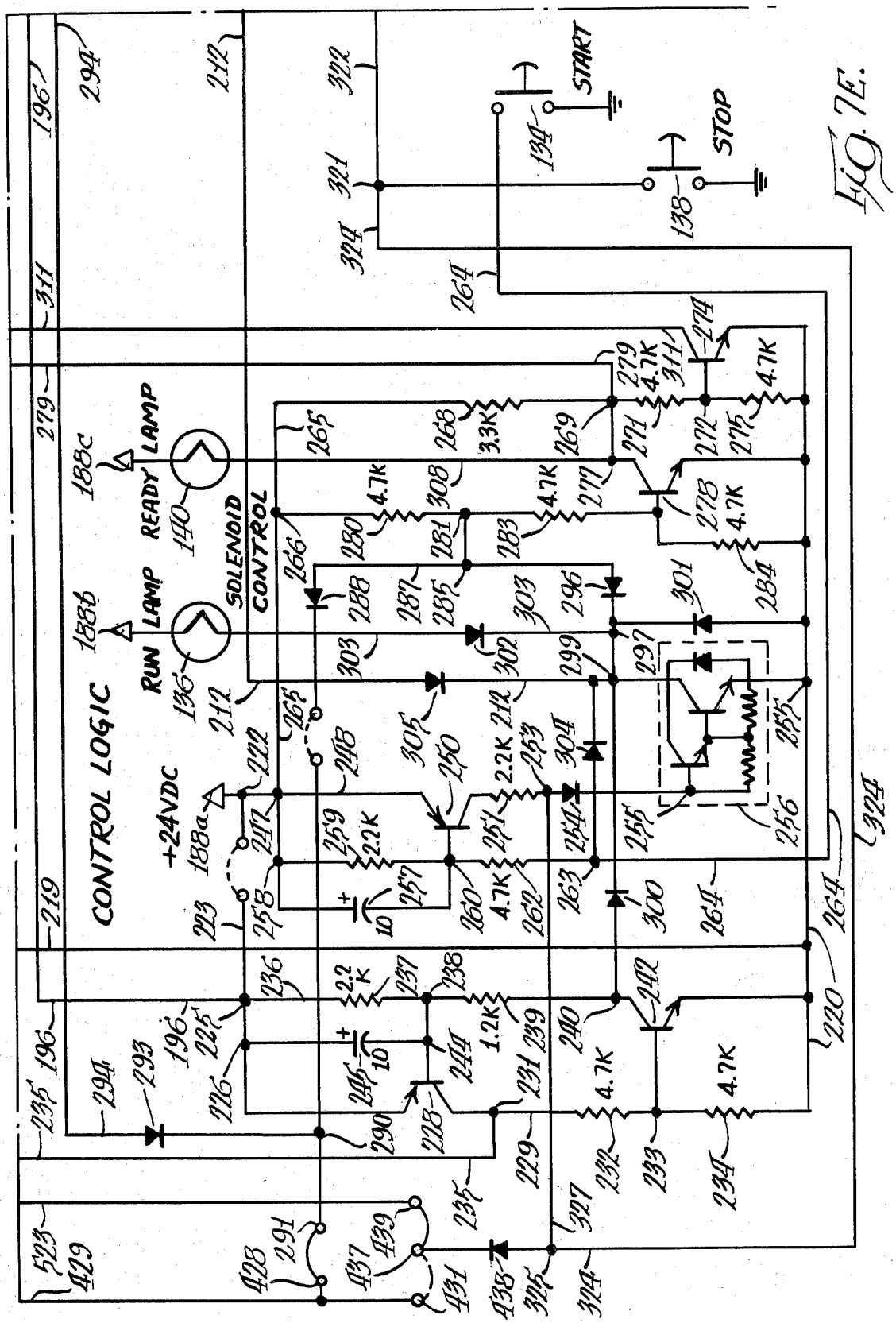

The electrical circuit for the present device can be conveniently devided into five circuit sections:
 (1) low voltage and motor power supply (FIG. 7F);
 (2) control logic (FIG. 7E);
 (3) eraser ramp control (FIGS. 7A and 7B);
 (4) splice detector (FIG. 7C); and
 (5) eraser phase control (FIG. 7D).

The low voltage and motor power supply section supplies 110 volts AC to the capstan motor 39, 24 volts DC to the pressure roller solenoid 50 and to the control electronics.

The control logic section controls the logical sequence of operation in the machine or in other words initiates the start, holding and stop functions.

The eraser ramp control section provides an analogue simulation for the ultimate control of the flux field in the erase coil.

The splice detector section converts the pulse generated by the splice sensor upon the sensing of a splice into a signal which stops the motion of the tape within the cartridge.

The erase phase control section converts the analogue simulation from the ramp control into a phase modulation by which the flux field of the eraser coil is controlled, or in other words, caused to come on strong and thereafter slowly fade away.

A. Motor and Low Voltage Power Supply

Referring particularly to FIGS. 7E and F, the device is adapted to be powered by ordinary 60 cycle 110 volt AC power. The two wires of a line cord 156 lead to terminals 157 and 159. Terminal 159 is connected to terminal 160 through a fuse 162. Terminal 157 is connected through line 163 to terminal 165. The capstan motor 39, a split phase, capacitor start, induction motor, is connected in series with microswitch 144 between terminals 160 and 165. As described above, the feeler of microswitch 144 is moved by the insertion of a cartridge into the machine, closing the circuit through the motor and thus setting the capstan into rotation. Terminals 160 and 165 are also connected through line 166 to the primary 168 of a transformer 169 in parallel with the motor 39 and microswitch 144.

The secondary 171 of transformer 169 is connected to a full wave rectifier 172 with chassis ground return consisting of the diodes 173 and 175 connected to the ends of the secondary 171 and a center tap 176 to chassis ground. The output of the rectifier is fed to terminal 178. From terminal 178, the rectified current is filtered by capacitor 179 connected between terminal 181 and ground and is fed to terminal 1 of an integrated voltage regulator 182. From terminal 3 of the voltage regulator, 24 volts DC is fed across terminal 184, which is connected to ground through capacitor 185 for high frequency suppression, to terminal 187 and from thence to 24 V power source connection 188 which is variously connected to similarly identified connections throughout the circuit, the actual physical connection, however, being omitted for reasons of simplicity. Diode 190 connected around the voltage regulator 182 provides a return path for any stored charge on capacitor 185 when the machine is unplugged.

Terminal 187 is also connected by line 191 to one blade 193 of the mode switch 132. Blade 193 has a contact 194 connected to an ERASE DISABLE line 196. The mode switch also includes a second blade 197 and contact 199. The toggle 200 of the switch is such as to hold blade 193, an enabling switch for the ERASE function, closed in the ERASE and BOTH position and open in the SPLICE FIND position, and blade 197, which serves a stop after erase function, closed in the ERASE position and open in the other positions.

Terminal 178 at the output of the rectifier 172 is also connected to deliver 24 volts DC (40 volts surge) to the pressure roller solenoid 52 through line 202, diode 203, and resistor 205. Capacitor 206 connected between line 202 and ground serves to filter the current to the pressure roller solenoid 52 and also to provide a reserve charge upon insertion of a cartridge to overcome the inductance of the pressure roller solenoid and the mechanical inertia or the system to bring up the pressure roller quickly when the solenoid is initially energized by operation of the START switch as will be later described. Line 208 containing capacitor 210 and resistor 211 connected in parallel across the solenoid 52 suppresses transients generated in the deenergization of the solenoid. Pressure roller solenoid ground line 212 connects to the remote end of solenoid 52 at terminal 213.

B. Control Logic

(1) Detailed Description

Referring particularly to FIG. 7E, the control logic section of the circuit is in a non-energized condition until the cartridge microswitch 146 (7F) is closed by the insertion of a cartridge into the machine. When switch 146 is closed it provides a chassis ground as at 214, the ground connection being made through terminal 215, and line 216 to ground bus 217 for the eraser ramp control and the splice detector sections of the circuit (FIGS. 7C, 7B, and 7A) and from bus 217 at terminal 218 (FIG. 7A) through lead 219 to bus 220 of the control logic circuit. By connecting the bus 220 to chassis ground, a completed circuit is established across the control logic board from the +24 volt DC connection 188a to the bus 220.

In the detailed description of this circuit section which follows, there are certain strappable options in the circuit to adapt the device to the needs of particular situations. These permit a circumventing or elimination of the mode switch 132 where erasure or splice finding will be invariably wanted. These optional lines or connections will be described as they occur in the circuit, but it will be understood that the circuit characterized as "normal" will have its mode of operation selected by the mode switch.

The +24 volt DC connection 188a is connected to terminal 222. From terminal 222, an optional, normally open line 223 extends to terminal 225. Line 196, coming from the ERASE contact 199 of the mode switch 132, is also connected to terminal 225. Terminal 225 is connected through terminal 226 to the emitter of a PNP transistor 228. The collector of transistor 228 is connected by line 229 through terminal 231, resistor 232, terminal 233, and resistor 234 to bus 220. Terminal 231 is connected to a ramp timer enable line 235 which extends to the eraser ramp control section (7A). Terminal 225 is also connected by line 236 through resistor 237, terminal 238, resistor 239 and terminal 240 to the collector of NPN transistor 242. The emitter of transistor 242 is connected to bus 220. Terminal 238 in line 236 is connected through terminal 244 to the base of transistor 228. A capacitor 245 is connected between terminals 226 and 224 across the emitter-base junction of transistor 228. The base of transistor 242 is connected to terminal 233 in line 229.

Power source 188a is connected through terminal 222 to terminal 247. That terminal is connected through line 248 to the emitter of transistor 250. The collector of that transistor is connected through resistor 251 to terminal 253 and from terminal 253 through diode 254 to the base terminal 255 of a darlington pair of compound transistor 256. The emitter of transistor 256 is connected to ground bus 220 at 255.

Terminal 247 is connected to terminal 258, and capacitor 257 and resistor 259 are connected in parallel between that terminal and terminal 260 which in turn is connected to the base of the transistor 250. Terminal 260 is connected through resistor 262 and terminal 263 to line 264 which leads to the START switch 134.

Terminal 247 is also connected through line 265 through terminal 266 and resistor 268 to terminal 269. From terminal 269, a line extends through resistor 271, terminal 272 connected to the base of transistor 274 and resistor 275 to ground bus 220. Terminal 269 is also connected to terminal 277 which is connected to the collector of transistor 278, the emitter of which is connected to ground bus 220.

Terminal 269 is also connected to the external DETECTOR PROTECT line 279 (7B and 7C).

Terminal 266 is also connected through resistor 280, terminal 281, and resistor 283 to the base of transistor 278. From the base, the line continues through resistor 284 to ground bus 220.

Terminal 281 is also connected to terminal 285 which in turn may have an optional, normally open connection through line 287 through diode 288 to terminal 290. Terminal 290 in turn is connected to strappable terminal 291 and also through diode 293 to the STOP AFTER ERASE line 294 which is connected to blade 197 of the mode switch 132 (7F). Terminal 285 is also connected through diode 296 to terminal 297, terminal 299 and diode 300 to terminal 240 at the collector of transistor 242. The collector of transistor 256 is also connected to terminal 299. Terminal 297 is connected through diode 301 to the ground bus 220 and is also connected by line 303 through diode 302 and the RUN lamp 136 to power connection 188b.

Diode 304 is connected between terminals 299 and 263. Terminal 299 is also connected through diode 305 to the SOLENOID CONTROL line 212 to terminal 213 at the remote side of the pressure roller solenoid 52.

The collector 277 of transistor 278 is also connected through line 308 and the READY lamp 140 to power source 188c.

A light dependent resistor (LDR) ENABLE or ground line 311 is connected between the collector of transistor 274 and one side of the lamp element 313 of the LDR 314 in the eraser lamp control section (7B).

The DETECTOR PROTECT line 279 is connected to one side of capacitor 316 in the splice detector section (7C), the other side of which is connected to transistor 317 through resistor 318.

The STOP switch 138 is connected on one side to ground and on the other side to terminal 321. Terminal 321 is connected by line 322 to contact 199 of switch 132. Terminal 321 is also connected through line 324 to terminal 325 and from there through line 327 to terminal 253 in the base drive line for transistor 256.

(2) Operation

Turning then, to the operation of the control logic circuit board, 24 volts DC is originally applied to power source 188 and thence to power points 188a, 188b, and 188c and to terminals 222 and 247 and line 265 connected to 188a upon plugging in the line cord. Insertion of a cartridge closes switches 144 and 146. Switch 144 starts the capstan motor 39. Upon closure of switch 146, the MODE switch being in the BOTH position, bus 220 is at chassis ground potential through microswitch 146, line 216, line 217, and line 219. Transistor 250 is off by virtue of the reverse bias derived from capacitor 257. Since transistor 256 depends on base drive from transistor 250, it, too, is off.

Transistor 278 is on by virtue of forward bias through resistors 280, 283, and 284, and positive current flows from power connection 188c through READY lamp 140, line 308, terminal 277, and transistor 278 to ground 220.

Transistor 274 is off by virtue of its base 272 being at ground potential through transistor 278.

Also, power is derived through MODE switch contact 194 through line 196 and applied to terminal 225. (Where erasure is inevitably wanted, the open alternative line 223 may be hard wired to put +24 volt DC on terminal 225 and thus make it independent of the MODE switch.) Transistor 228 if off, however, by virtue of the reverse bias imposed on the base by capacitor 245. Likewise, transistor 242 is off, lacking base drive through terminal 233 from transistor 228.

When the START switch 134 is momentarily closed, potential at terminal 263 drops to ground through START line 264, so imposing a forward bias through resistors 262 and 259 to the base terminal 260 of transistor 250, turning it on. With it on, base drive is applied to transistor 256 through resistor 251, terminal 253, and diode 254, so turning transistor 256 on. When it is on, several functions occur simultaneously.

Continuous base drive for transistor 250 is provided through resistors 259 and 262, terminal 263, diode 304, terminal 299, and transistor 256 to ground. Thus transistors 250 and 256 comprise a holding circuit for the control logic board following the release of the START switch.

With transistor 256 on, a circuit is closed from the pressure roller solenoid 52 through terminal 213, line 212, diode 305 and transistor 256 to ground, so energizing it. Thus tape traverse is started. Diode 305 prevents the machine from turning on in the START mode if a cartridge is inserted before the machine is plugged in. Diode 301, in parallel with transistor 256, bypasses inductive transients from the pressure roller solenoid 52 which might damage the transistor 256.

A ground path for the RUN lamp 136 is provided through transistor 256, terminal 299, terminal 297, diode 302, and line 303, turning it on.

The READY lamp 140 is turned off by virtue of turning off transistor 278, base drive being diverted from terminal 281 to terminal 285, diode 296, and transistor 256 to ground.

Transistor 278 having been turned off, transistor 274 is turned on, base drive being derived from line 265 through resistors 268, 271, and 275, so providing a ground path through the collector-connected LDR ENABLE line 311, for the lamp 313 of the LDR 314 in the eraser ramp control circuit. Also, terminal 269 between resistor 268 and resistor 271 goes from ground to a positive potential when transistor 278 turns off to deliver current through the DETECTOR PROTECT line 279 to capacitor 316 and resistor 318 to cause a momentary forwardly biasing current flow to the base of transistor 317 in the splice detector circuit to turn it on. As will be later described, when transistor 317 is on, the splice detector is disabled. As soon as capacitor 316 is fully charged, the base drive is lost and transistor 317 is turned off, so enabling the splice detector again. The time of charging of capacitor 316 however is sufficient to prevent the pulse attendent upon initial movement of the pinch roller to driving position from actuating the splice detector. Other means in the apparatus exist for disabling the splice detector section as will be later described, but transistor 317 is necessary under all operating circumstances.

The last of the three additional operations triggered by the turning on of the transistor 256 is centered in transistors 228 and 242. When transistor 256 turns on, a current path is provided from terminal 240 through diode 300 to terminal 299. By closing the circuit to ground through resistors 237 and 239, forward bias is applied to the base of transistor 288, so turning it on. This establishes a conductive path through resistors 232 and 234 to ground which applies a forward bias to the base of transistor 242, turning it on. Thus transistors 228 and 242 latch each other into on states. Thus 24 volts DC is applied from terminal 187 (7F) through the MODE terminal 225, switch contact 194, line 196, transistor 228 and terminal 231 to the RAMP TIMER ENABLE line 235 which constitutes the top voltage supply line of the eraser ramp control subcircuit.

When MODE switch toggle 200 is in its SPLICE FIND (only) position, switch blade 193 will be open, and thus no power will be delivered to this section via line 196 and terminal 255, so inactivating this section and preventing delivery of power to the eraser ramp control section through line 235.

When the STOP switch 138 is closed, base drive of transistor 256 is shorted to ground through lines 324 and 327, thereby turning it off. As a consequence, transistors 250, 256, and 274 are turned off and transistor 278 is turned on. Transistors 228 and 242, however, remain on. Thus the RUN lamp 136 is deenergized, the READY lamp 140 is re-energized, the pressure roller solenoid 52 is deenergized, the LDR ENABLE line 311 is interrupted, and the charge on the capacitor 316 connected to the base of the splice detector delay transistor 317 is discharged to ground through transistor 278. The RAMP TIMER ENABLE line 235 remains energized, however.

C. ERASER RAMP CONTROL

(1) Detailed Description

It will be noted in the drawings that the resistor element 330 of the LDR 334 (7B) provides the interface between the eraser ramp control section (7A and 7B) and the eraser phase control section of the circuit (7D), one side of the resistor being connected through line 331 to terminal 333 and the other side of the resistor being connected through resistor 332, potentiometer 335, and line 334 to terminal 336 in the phase control section. The current flow through resistor 330 governs the phase control section, and the current flow in turn is governed by the intensity of the lamp 313, the resistance being low when lamp is bright and increasing as the lamp dims. It will be recalled that the lamp has been enabled by virtue of a ground connection through line 311 and transistor 274.

Referring particularly to FIGS. 7A and 7B, a precision timer 337 has terminals 5 and 6 connected to the +24 volt line 235 at terminal 339. Terminal 7 of the timer 337 is connected to line 340 which in turn is connected to the trigger terminal 1 of the timer 337 through terminal 342 and through terminal 343 and resistor 345 to the ground line 217. The timer 337 is arranged to provide a conductive path between terminals 6 and 7 upon application of voltage thereacross for a timed interval following energizaton of the trigger terminal 1 and thereafter to open the circuit between terminal 6 and 7. For the present purposes, a time interval of 1.2 seconds is appropriate. The time interval is determined by values of resistors 346 and 348 and capacitor 349.

The next terminal 351 in line 235 is connected by line 353 to terminal 352 which in turn is connected to the emitter of transistor 354 and, through resistor 355, to the base of transistor 354. From the base connection, line 353 continues through resistor 357 and capacitor 358 to terminal 343 in line 340. The collector of transistor 354 is connected by line 360 through resistor 361 to the trigger input terminal 1 of precision timer 363.

The next terminal 365 in line 235 is connected to the collector of transistor 366. The base of transistor 366 is connected through resistor 368 to terminal 342 in line 340. The emitter of transistor 366 is connected through line 370 through resistor 371 to terminal 373. Terminal 373 is connected through resistor 374 to terminal 376 and from terminal 376 through combined resistor 377 to the ground line 217.

Where two resistors are shown together in the drawings as in the case of the combined resistor 377, it is intended that one of these resistors be replaceable by one of another value in order to alter the parameters of the circuit to adjust the apparatus to varying circumstances. Such combined resistors will be designated by a single identifying numeral.

Terminal 376 is also connected through terminal 379 and resistor 380 to the positive input terminal 6 of precision timer 363. The positive output terminal 7 is connected to ground line 217. Terminal 379 is also connected across capacitor 382 to ground in parallel with the circuit through terminals 6 and 7 of the timer 363.

The timer 363 is established to have initially an open path between terminals 6 and 7 when the circuit is energized. Upon triggering, the path closes or becomes conductive for a limited period and thereafter opens. An appropriate time interval of conductivity in the present context is 0.35 seconds. The resistors and capacitor indicated generally at 384 determine the time interval. The timer is energized from the next terminal 385 in the +24 volt DC line 235 and is grounded to line 217 from terminal 8.

The next terminal 387 in the power supply line 235 is connected through resistor 388 to the collector of transistor 390. The base of transistor 390 is connected to terminal 373.

The next terminal 391 in the power supply line is connected through resistor 393 to the collector of transistor 394, the emitter of which is connected to terminal 396. The emitter of transistor 390 is connected to the base of transistor 394 thus placing transistors 390 and 394 in a darlington configuration. Terminal 396 is connected through the lamp 313 of the LDR to the previously described LDR ENABLE line 311. Terminal 396 is also connected to ground 217 through terminal 399 and ballast resistor 401. Terminal 399 is also connected through diode 402 to terminal 404.

The next terminal 405 on the +24 volt supply line 235 is connected to the power input terminal 5 of precision timer 407 and through resistor 408 to terminal 6 thereof, and through line 409 to terminal 411 and to the trigger terminal 1 of the precision timer. The combined resistors and capacitor indicated generally at 412 determine the time interval. Terminal 7 and ground terminal 4 of the timer are connected through terminal 414 to the ground line 217. The condition of this timer is to provide initially an open circuit between terminals 6 and 7 and after the expiration of the timed interval, for example, 12 seconds, provide a closed conductive path between these terminals.

The next terminal 415 in the positive voltage supply line 235 is connected through resistor 417 to the collector of transistor 418, the emitter of which is connected to ground. The base of transistor 418 is connected to terminal 411 in line 409 through resistor 420 and to ground through resistor 421.

The last terminal 423 in the power supply line 235 is connected through resistor 424 to terminal 426. Terminal 426 is connected through diode 427 to terminal 404 which in turn, to the collector of transistor 430, and, as described above, to diode 402. Terminal 404 is also connected to the end-of-erase stop line 429 which returns to the control logic section (7E, left edge) and terminates in terminals 428 and 431. In the normal wiring, terminal 428 is wired to terminal 291. Terminal 431 is open, but, as a strappable option, may be wired to terminal 437 which is connected through diode 438 to terminal 325. Terminal 437 is normally connected to terminal 439. The collector of transistor 418 is connected to the base of transistor 430, and through resistor 432, to ground. The emitter of transistor 430 is connected to ground. Terminal 426 is also connected through resistor 433 to the base of transistor 435 and through resistor 436 to the ground bus 217. Transistor 435 provides the interface with the splice detector section and prevents the splice detector from operating until the erase process is completed.

(2) Operation

The operation of the eraser ramp control is as follows. It will be recalled that timer 337 provides initially a conductive path between terminals 6 and 7 thereof but after the timed interval, the path opens. Upon the application of +24 volts DC to line 235, current flows through terminals 6 and 7 to line 340 which triggers the start of the timing interval. Contrariwise, timer 407 is initially nonconductive between terminals 6 and 7 at the start of a cycle. As positive current is applied to line 235, the timer is triggered from terminal 405 through line 409 and terminal 411 to the trigger terminal 1 of the timer. The nonconductive condition between terminals 6 and 7 persists through the timed interval and then becomes conductive. In this initial condition, terminal 411 is at a positive voltage with respect to ground, and base drive is thus provided to transistor 418 through the biasing resistors 420 and 421, so turning transistor 418 on. Thus the collector of that transistor is essentially at ground potential and no base drive is applied to transistor 430, so maintaining it an off position. Diode 402 prevents energization of the LDR lamp 313 from terminal 423 in power line 235 through terminal 404.

Reverting to timer 337, since the circuit between terminal 6 and 7 is closed, terminal 7 is at +24 volts and thus there is a 24 volt drop between terminal 342 across resistor 345 and ground 217. Thus forward bias is applied to NPN transistor 366 through terminal 342 and resistor 368, turning it onn and no bias is applied to transistor 354 since both sides of the base connection are at equal potential, so maintaining that transistor in an off condition.

Transistor 366 being on, base drive is applied to transistor 390 through line 370 and terminal 373 to turn it on which in turn turns on transistor 394 which thus turns on the lamp element 313 of the LDR 314 from terminal 391 through transistor 394, the lamp element 313, the LDR ENABLE line 311, transistor 274 (7E) and the ground bus 220. In the course of turning transistor 390 on, terminal 373 is energized which produces a voltage drop through terminals 376 and 379 across the capacitor 382 equivalent to the voltage drop across the combined resistors 377 in parallel therewith. It will be noted that capacitor 382 is relatively large.

Voltage is also applied from terminal 396 to terminal 399 and thence through ballast resistor 401 which serves to linearize and stabilize the lamp element 313 against ambient effects. Resistor 393 between power line terminal 391 and the collector of transistor 394 is a current limiting resistor for the lamp.

The lamp 313 being fully on, the resistance element 330 of the LDR 314 is at minimum value. Voltage is also being applied from the ballast resistor terminal 399 through diode 402 to terminal 404 connected to the collector of transistor 430. Since that transistor lacks base drive, however, no current flows.

The described situation persists until timer 337 times out. At that time, the internal circuit between terminals 6 and 7 is interrupted. At this moment, terminal 7 and line 340 go from +24 volts to ground potential. Under this circumstance, base drive is removed through terminal 342 from the transistor 366 and it is turned off. Base drive continues on transistor 390, however, by virtue of the discharge of capacitor 382 so that transistor 394 remains conductive and the lamp remains lit.

When line 340 goes to ground potential, the negative plate of capacitor 358 likewise goes to ground potential so creating a voltage drop and current flow from terminal 351 in power line 235 through terminal 352, the base of transistor 354 and the positive plate of capacitor 358 until capacitor 358 is fully charged. Thus, while the capacitor is charging, forward drive is applied to the base of transistor 354 and current is delivered through the emitter thereof from terminal 352 through the collector and line 360 to the trigger terminal 1 of timer 363 to start its timing function and to close the circuit between terminal 6 and 7. The effect of this is to drain a large part of the charge on capacitor 382 off. The timed duration of timer 363, 0.35 seconds is very short so that a limited amount of the charge on the capacitor is drained away. When the timer times out, the internal path between terminal 6 and 7 opens, and capacitor 382 must discharge solely through the combined resistances 377 and as base current through transistor 390.

The reason underlying the presence of timer 363 is that the LDR does not function in a linear fashion; that is the resistance value does not vary linearly with the voltage across the lamp element. Rather, as the voltage diminishes, the rate of increase of the resistance is initially slow and becomes larger. The draining off of a part of the charge on the capacitor 382 through the timer 363 thus moves the LDR quickly to a more responsive part of its curve.

Because of the lack of demand for large base current of the darlington configured transistors 390 and 394, the conductivity of transistor 394 will remain proportionate to the charge on capacitor 382 to the very end of the discharge. The low base current flow to transistor 390 and the high resistance of the combined resistors 377 after timer 363 times out results in a relatively extended time for the discharge of capacitor 382. The effect of the timer 363 and the LDR circuitry, once timer 363 is triggered, is to jump the resistance of the resistance element 330 of the LDR ahead on the flat portion of its curve, and after timer 363 turns off, to achieve a substantially linear increase in the resistance thereof to maximum value.

As stated above, timer 407 is triggered at the same time as timer 337, the connection between terminal 6 and 7 being opened so as to apply positive voltage to the base of transistor 418 from power line terminal 405 through line 409 and terminal 411. The time interval of timer 407 was given illustratively above as 12 seconds so as to remain in its open circuit condition until the time cycles of timers 337 and 363 have run out and capacitor 382 has been essentially fully discharged. At the conclusion of the timed interval, the circuit between timer 407 terminals 6 and 7 closes, so shorting the base drive on transistor 418 to ground through terminal 7 and terminal 414. Thus transistor 418 is turned off. When transistor 418 turns off, the collector thereof reverts to +24 volts so applying base drive to transistor 430 which drops the collector thereof to ground potential so imposing that potential on the END OF ERASE STOP line 429 and to terminals 428 and 431 at the end of that line in the control logic subcircuit (7E).

When the mode switch 132 is in the ERASE position, it will be recalled that the STOP AFTER ERASE switch blade 197 is closed. Under this circumstance, base drive to the compound transistor 256 is shorted to ground just as with operation of the STOP switch, the ground path going from terminal 428 to the hard-wired terminal 291, terminal 290, line 294, (7F) MODE switch blade 197, line 322, terminal 321, line 324, (7E) terminal 325, line 327, terminal 253, and diode 254 to the base of transistor 256. When both functions, erase and splice find, are wanted, the MODE switch 132 will open blade 197, interrupting this path. The base drive of transistor 435 is short circuited to ground through terminal 426, diode 427, terminal 404 and transistor 430, thus removing the collector of transistor 435 from ground potential and placing it in a floating condition. Diode 402 blocks voltage at terminal 426 from the lamp element 313 of the LDR.

It will be noted that once the circuit is energized by closing the START switch, the erase ramp control enabling transistors 228 and 242 lock each other on, and subsequent grounding of terminal 253 in the base drive to compound transistor 256, either by the STOP switch or splice detection, will not turn them off. They can be turned off only by cartridge removal to open microswitch 146. Consequently, timer 407, after its timed "off" period, stays on as long as the cartridge is not removed, disabling subsequent erase operations and enabling immediate splice finding operations with restarts by the START switch.

D. Splice Detector

(1) Detailed Description

The splice detector (7C) shares ground line 217 with the eraser ramp control. It likewise has a +24 volt DC line 440 powered by connection 188*d* to source 188 in the power supply subcircuit. At the left of the drawing, for the first-described form of sensor (FIGS. 1, 2, and 3) a line 442 extends through resistor 443 to terminal 445. Line 444 extends from terminal 445 to the coil 112 of the splice sensor 110 (7F). At its other end, the coil 112 is connected through line 446 to the cartridge switch 146 and to ground 214. Thus positive DC current is continuously flowing to the splice sensor coil.

A line 448 extends from the 24 volt line 440 through resistor 449, terminal 451, and resistor 452 to ground 217. A next line 454 extends through resistor 455 and terminal 457 to the collector of transistor 459. The emitter of the transistor is connected through resistor 460, terminal 462, resistor 463, terminal 465 and resistor 466 to ground 217. The base of transistor 459 is connected through terminal 468 and capacitor 469 to terminal 445 in line 442. Terminal 468 is connected through resistor 471 to terminal 451. Terminal 451 is connected to terminal 462 through capacitor 472. Terminal 465 is also connected to ground through capacitor 474 in parallel with resistor 466. Terminal 457 is also connected to ground in parallel with transistor 459 through capacitor 475, resistor 477 and potentiometer 478.

The next line 480 interconnecting the power supply line 440 and ground includes resistor 481, terminal 483, terminal 484 and resistor 485. Terminal 484 is connected to the wiper 487 of the potentiometer 478 through capacitor 488.

The next line 490 extends from the 24 volt line through resistor 491, to the anode of the zener diode 493, to one side of capacitor 494, the other side of which is connected to terminal 483 in line 480, and the collector of transistor 496. The base of transistor 496 is connected to terminal 484 in line 480. The emitter of the transistor is connected through resistances 497 and 499 to the ground line 217. Capacitor 500 is connected in parallel across resistor 499 to ground.

Line 502 is connected through resistor 503 to the cathode of zener diode 493 and thence through capacitor 505 and resistor 506 to the collector of transistor 508. The base of transistor 508 is connected to the collector of transistor 435 through line 509 (7B). The emitter of transistor 508 is connected to ground 217. Line 509 is connected at terminal 510 to the collector of transistor 317, previously discussed as the transistor which delays operation of the splice detector until after tape drive has been started. It will be appreciated that the very act of closing the detector element on the tape will generate a current pulse which, without transistor 317, would immediately act as if it had found a splice and shut the machine off. The base of transistor 317 is connected, as stated before, through resistor 318 to capacitor 316 and through resistor 512 to the ground line 217. The emitter of the transistor is connected to ground line 217.

A resistor 515 is connected between the base of transistor 508 and the ground line 217. The emitter of transistor 508 is also connected to ground line 217.

A capacitor 517 is connected between the power line 440 and the base of transistor 518, the emitter of which is connected to the power line 440 at terminal 520. The base of transistor 518 is connected to the cathode of zener diode 493. The collector of transistor 518 is connected through resistor 521 to terminal 514 in line 509.

Finally, a SENSOR STOP line 523 extends from the power line 440 through resistor 524 to terminal 526, line 523 continuing to the collector of transistor 508, and from terminal 526 to terminal 439 in the control logic circuit (7B, 7A, 7E).

(2) Operation

As was stated above, line 440 is at +24 volts and line 217 is at chassis ground potential. In the case of the modification of FIGS. 1, 2, and 3, current is supplied to the coil 112 of the splice detector 110 through current limiting resistor 443 in line 442, which is grounded through line 446. Terminal 445 in line 442 is connected through capacitor 469 to the base of transistor 459 which constitutes the first stage of an amplifier for the tape-splice-derived pulse. Transistor 459 is employed as a class B amplifier stage, bias being derived from resistors 452 and 449 and transferred to the base of the transistor through terminal 451 and resistor 471.

When a tape splice actuates the splice detector, the reluctance of the magnetic circuit of the detector is abruptly altered, so momentarily dropping the voltage at terminal 445 and thus momentarily applying less forward bias to the base of transistor 459 through the capacitor 469. This first amplifier stage is a bootstrap amplifier, resistor 471 and capacitor 472 providing the bootstrapping effect to increase the impedance the coil drives into so that it is not electrically loaded down. The bootstrapping effect is further enhanced by resistors 460 and 463. The gain of this first stage of amplification is established by the direct ratio of the collector transistor 455 to the combined value of the emitter resistors 460 and 463. Resistor 466 provides additional DC feedback to the first stage. Bypass capacitor 474 removes unwanted low frequency noise from the first stage and increases the AC gain at higher frequencies.

The amplified signal from the first stage of the amplifier is transmitted through terminal 457, capacitor 475, resistor 477, and potentiometer 478 to ground. The wiper 487 of the potentiometer derives an adjustable portion of the signal and feeds it through capacitor 488 to the base of transistor 496 which constitutes the second stage of amplification. Resistors 481 and 485 in line 480 provide the DC bias for transistor 496. The gain of the second stage of amplification is established by the direct ratio of the collector resistor 491 to the emitter resistor 497 in line 490. Capacitor 494 between lines 490 and 480 provides for negative feedback of high frequency noise to cancel it out in the second stage. Capacitor 500, like capacitor 474 in the first stage grounds out unwanted low frequencies but permits the amplification of higher frequencies. The collector of transistor 496 is connected to the anode of zener diode 493 as described above. The cathode of the zener diode is connected to the base of transistor 518.

The potentiometer wiper 487 of the potentiometer 478 will be so adjusted as to generate a negative pulse at the collector of the transistor 496 upon movement of the splice incident to the passage of splicing tape sufficient to achieve a zener breakdown in the diode 493. The potentiometer wiper 487 must be established at a point to discriminate against smaller displacements of the splice sensor such as might arise from variations in tape thickness, dirt, irregularities on the surface of the pinch roller, ambient vibrations external to the machine, etc.

Transistor 518 is initially off, reverse bias having been applied to the base thereof by capacitor 517 when power is first applied to line 440. When a negative pulse is delivered to the base of that transistor through the zener diode 493, the transistor is turned on.

Assuming that the operation of the splice detector is not inhibited either by the detector protect line 279 and its associated transistor 317 or by the transistor 435 (7B) interfacing between the eraser ramp control in the splice detector, or in other words that transistor 317 is off and that line 509 is floating, current flows through resistor 521, terminal 514 and resistor 515 to ground, so imposing forward bias on transistor 508. When transistor 508 is on, its collector and terminal 526 goes to essentially ground condition.

With the collector of 508 to ground, base drive is applied to transistor 518 through line 502 and resistor 503, capacitor 505 and resistor 506 so maintaining transistor 518 and therefore transistor 508 on for the period of time it takes capacitor 505 to charge. Thus the time interval that transistor 508 is on is extended beyond the momentary pulse derived from the zener diode 493 to provide a more definite signal to terminal 526.

Terminal 526 is connected through the SENSOR STOP line 523 to terminal 439 (7E) in the control logic subcircuit. This grounds out base drive for the compound transistor 256 in the control logic subsection through terminal 253, line 327, terminal 325, diode 438, terminal 437, terminal 439, line 523 and transistor 508 in the splice detector circuit to result in a stopping of the tape drive and otherwise placing the control logic circuit in the same condition as described in conjunction with the operation of the stop switch 138.

It will be recalled that the DETECTOR PROTECT transistor 317 (7C) is turned on at the time the START switch is energized. The transistor receives collector current through the momentarily on transistor 518 which in turn receives base drive from capacitor 517 until that capacitor is fully charged. Simultaneously, it receives base drive from terminal 188c (FIG. 7E), the READY lamp 140, terminals 277 and 269 (transistor 278 being off), the DETECTOR PROTECT line 279, capacitor 316 and resistor 318 until capacitor 316 is fully charged. Alternatively, terminal 269 will be energized from line 265 through resistor 268 in the event of a defective READY lamp. Thus terminal 514 is dropped to ground potential, and, therefore, base drive for transistor 508 is lacking. The purpose served is this. Obviously, when the pressure roller is brought to bear on the tape against the capstan, the mechanical movement creates a pulse analogous to the passage of splicing tape through the sensor. Without transistor 317, therefore, the actuation of the start switch would immediately result in a stoppage. Transistor 317, by deactivating transistor 508, prevents the delivery of a stopping pulse through line 523 during the initial movement of the pressure roller.

Transistor 435 which interfaces between the eraser ramp control section in the splice detector section serves a similar purpose. That transistor is turned on during the initial, timed, "off" period of timer 407 and so, likewise, establishes the base of transistor 508 at ground potential through terminal 514 and line 509, so depriving transistor 508 of base drive. Thus splice detection will not occur until erasure has been completed and timer 407 has gone to its "on" condition.

It will be recalled that when the MODE switch is set to SPLICE FIND, switch 193 is open, so disconnecting terminal 225 and transistors 228 and 242 in the control logic section (7E). As a consequence, the eraser ramp control section is not empowered, and base drive for transistor 435 is never present. Thus, splice location is not inhibited by transistor 435 being on.

The first described sensor, being based on reluctance modulation, requires a field to be modulated and hence continuous current through the sensor coil 112. The second described sensor, being based on voltage or current generation, needs no continuous energization, so line 442 between the power line 440 and terminal 445 will be omitted.

While the circuit values as shown in the drawing would work in conjunction with the second described sensor, optimum performance will be obtained by the following alterations.

The polarity of capacitor 469 should be reversed.
Capacitor 469 whould be 1 microfarad
Capacitor 474 should be 47 microfarad
Capacitor 494 should be 0.001 microfarad
Resistor 449 should be 82 Kohms
Resistor 481 should be 47 Kohms
Resistor 460 should be 4.7 ohms
Resistor 466 should be 1 Kohms
Resistor 497 should be 100 ohms The advantages of this second form are substantial. First, of course, is the economic advantage in the general simplification. Second, the simplicity considerably facilitates adjustment and ensures against loss of adjustment. Third, it possesses an inherently greater sensitivity. Being based on current generation, it goes from a zero current condition to a positive condition which is considerably more discernable than a modulation of an existing current. In conjunction with this, the need for lever-amplified movement will be noted in the first form and in the Weaver patent.

Fourth, the signal is generated by a variation in proximity of the permanent magnet to the coil. There is no physical contact such that movement might be impeded and no intervening object to be moved which would inevitably present the possibility of binding.

E. Eraser Phase Control

(1) Detailed Description

Terminal 157 of the power input is connected through line 532 to terminal 533 which is connected in turn to one side of a triac 535. The other side of the triac is connected to terminal 536 at one side of the erase coil 84. The other side of the erase coil is connected to terminal 538 and from that terminal through line 539 through a slow-blow fuse 541 and to terminal 159 on the other side of the power input supply. The erase indicator lamp 142 is connected in parallel around the erase coil 84. Capacitor 541 and resistor 542 are connected in parallel around the triac for the suppression of transients.

The rest of the circuit relates to the control of the triac.

No claim of novelty in this portion of the circuit is made in and of itself. This circuit is basically described in General Electric, SCR Manual, 5th Edition, (1972) Page 266. The particular efficacy of this circuit for the present purpose and its control by the LDR are, however, believed to be novel aspects.

Describing the circuit from the right side instead of the left side as was done with the previous sections, terminal 533 is connected to a full wave rectifier consisting of the diodes 543, 544, 545, and 546 which imposes unfiltered positive voltage on line 548 and negative voltage or relative ground on line 550. The other side of the rectifier is connected through current limiting resistor 552 to terminal 538. Line 554 is connected between the power line 548 and ground 550 and includes in it resistor 556, terminal 558 and zener diode 560. A second line 562 extends between power line 548 and ground line 550 and includes an SCR 564 therein with the anode connected to the power line and the cathode connected to ground.

The gate of the SCR is connected to base 1 of a unijunction transistor 568 and from there to ground through resistor 570. Base 2 of the unijunction transistor 568 is connected through resistor 572 to terminal 336 and thence to terminal 558. The emitter of the unijunction transistor is connected to terminal 333 which in turn is connected through capacitor 574 to ground.

To the left of line 562, a line 576 having diodes 578 and 580 therein interconnects the power line 548 and ground 550. The gate of the triac 535 is connected through line 582 through terminal 583 and a resistor 584 to terminal 585 line 576 between the diodes 578 and 580. Line 586 including resistor 587 connected between terminals 583 and 536.

(2) Operation

It will be appreciated that the erase coil 84 is connected directly across the 60 cycle AC power line and that the triac 535 is in series therewith. It will also be appreciated that the erase coil constitutes a virtually pure inductance, having very little resistance, and that the voltage phase shift thereacross will be very nearly a full 90° in reference to the current curve.

The diode bridge consisting of diodes 543 and 546 imposes an unfiltered full wave rectified voltage on line 548 in reference to ground 550 which at every half cycle drops to zero and rises to a positive maximum. Resistor 556 in with the zener diode 560 limits the voltage applied across the unijunction diode, the heart of a relaxation oscillator, to 24 volts.

The relaxation oscillator consists of resistor 572 and LDR resistor 330, resistor 332, and potentiometer 335 in the eraser ramp control section (7B) connected between the emitter and base 2 of the unijunction transistor 568 and capacitor 574 and resistor 570 connected between base 1 and the emitter of the transistor. The combination of resistors 332 and 335 and the LDR resistor 330 can be regarded as a lumped varying resistance, initially low and rising upon ramp down. The potentiometer 335 is adjusted so that it just allows the oscillator to fire quickly enough to develop a full flux wave form when the LDR resistance is at its minimum and progressively slower as the resistance increases.

At the start of a current cycle, line 548 is without current flow therethrough and therefore unijunction transistor 568 is disabled, SCR 564 is off and triac 535 is off. As current rises in the positive direction, charging current is supplied to the capacitor 574 of the relaxation oscillator 568, and a voltage is applied across the SCR 564 and triac 535, so enabling them. Because of the low resistance, capacitor 574 charges and the oscillator fires substantially immediately, so gating the SCR on. With the SCR on, current flows through diode 543, line 548, line 562, the SCR 564 and diode 580 across the voltage divider consisting of resistors 584 and 587 and to the other side of the line at 536. By virtue of positive potential existing at terminal 583, a positive forward pulse is delivered to the gate of the triac to make it conductive.

By virtue of the full wave rectification existing in line 548, the oscillator and the SCR will respectively be triggered and enabled with both the positive and negative going oscillations in line current. Upon the negative going oscillation, negative current will flow from line 532 through diode 545, line 550, SCR 564, diode 578, and the voltage divider resistors 584 and 587 to apply a negative pulse to the gate of the triac 535. Thus the appropriate pulse is applied to the gate of the triac for each half cycle of the current.

As the resistance in the LDR increases with the dimming of the lamp 313, the resistance in the emitter-base 2 loop of the relaxation oscillator increases, so increasing the charging time of the capacitor 574. Under this circumstance, the oscillator fires an increasing period of time after the zero crossing of the current trace.

Assuming no inductive distortion, the current trace across the triac would be a sine wave with the current rise time progressively lagging the zero crossing of the theoretical sine wave trace. However, because of the inductance of the erase coil, current through the coil will not shut off with the triac, and a very different current curve, and hence field curve will result. Thus, as the onset of current flow begins increasingly to be delayed in each half cycle, there is a momentary field collapse at the approximate instant of maximum field strength. Thus the maximum excursion of field strength is progressively whittled away as the LDR lamp dims to the point where the relaxation oscillator delays turn on of the SCR and hence triac until the triac is turning on only briefly before turn off by the current crossing the zero axis.

The unique nature of the triac gating circuit is required because of the highly reactive load being controlled by the triac. Thyristors are not generally employed to control highly inductive loads. (Motors are not considered to be highly inductive loads in comparison with an erase coil.)

III. Summary

To summarize, when the MODE switch is placed in the BOTH position and a cartridge is inserted, the READY lamp turns on, the capstan motor starts, and line 217 of the eraser ramp control and splice detector sections and line 220 of the control logic section are connected to chassis ground. When the start button is pushed, the pressure roller is brought up to bear on the tape against the capstan, the READY lamp goes out, the RUN lamp comes on, power is delivered to line 235 of the eraser ramp control section, and the splice detector is momentarily disabled through capacitor 316. The splice detector section is also disabled by timer 407 being on. The lamp 313 of the LDR 314 is of maximum brightness, so reducing the resistance thereof to a minimum and causing the relaxation oscillator of the eraser phase control section to fire virtually immediately upon zero crossing of the current trace, so causing the erase coil 84 to generate an erase field as illustrated in FIG. 8A. When timer 337 of the eraser ramp control section times out, timer 363 turns on for a brief period, so dumping a large part of the charge on capacitor 382. At the end of the ON period of timer 363, that timer goes off (FIG. 8B) and the capacitor 382 thereafter discharges slowly through the resistors 377 and the base connection with transistor 390 to diminish progressively the current through the LDR lamp 313 to cause the resistance of the resistor thereof to rise steadily. The amplitude of the erase field is thereby diminished to vanishing as shown in FIGS. 8B and 8C.

A timed interval after closing the START switch sufficient to accommodate comfortably the erase field and its gradual extinction, timer 407 turns on and enables the splice detector. When a splice is detected thereafter, the SENSOR STOP line 523 is placed is placed at ground potential and, by virtue of the hard wiring between terminals 437 and 439, grounds out the control logic section except for the ERASER RAMP CONTROL ENABLE portion thereof, dropping out the pinch roller, extinguishing the START lamp and turning on the READY lamp.

It will be noted that switch blade 197 of the mode switch 132 is open in the BOTH position, so interrupting the circuit to the grounding terminal 325 of the control logic section through the END OF ERASE STOP line 429, the STOP AFTER ERASE line 294 and the STOP line 322, 324.

Where the ERASE function is selected on the mode switch, the ready, start, and run functions are exactly the same as in the combined mode of operation. Throwing the toggle switch into the ERASE position however closes blade 197 on its contact and thus, when the "off" time of timer 407 has expired and that timer goes on, a ground line for terminal 325 in the control logic circuit is established through switch blade 197, and the pinch roller immediately drops away. The splice detector is still conditioned to function; it is just that operation directly dependent on timer 407 occurs first.

When the switch is moved to the SPLICE FIND function, switch blades 193 and 197 are opened. Opening of blade 193 disables the erase ramp control by virtue of a failure of delivery of power to the power line 235. Under this circumstance, transistor 435 which interfaces between the eraser ramp control and the splice detector section is never turned on. Consequently, the collector 509 is never at ground potential, and the splice detector is therefore never inhibited by transistor 435. Thus splice detection can proceed as soon as the start button is pushed and capacitor 279 is fully charged. Opening of blade 197, as with the BOTH function, opens the STOP AFTER ERASE line 294.

These three options are capable of being hard wired into the device, so dispensing with the mode switch, depending on the customer's intended use. In these situations, the mode switch, the ERASE DISABLE line 196, the STOP AFTER ERASE line 294, and lines 322 and 191 leading to the switch elements will be omitted.

To take the simplest case first, that of an ERASE only function, line 223 between terminal 222 and terminal 225 is hard wired (FIG. 7E). The straps between terminals 428 and 291 and between terminals 437 and 439 are removed. A strap is provided between terminal 431 and 437.

The strap in line 223 insures that terminal 225 is energized whenever the start button is pushed, this terminal energizing the holding transistors 228 and 242 for the eraser ramp control section and empowering it through RAMP TIMER ENABLE line 235. Thus, when the START button is pushed, the normal erasure process is initiated and continues in the same fashion as described above. When timer 407 times out at the conclusion of the erasure process, transistor 430 turns on and provides a ground path for the base drive on the compound transistor 256 through terminal 253, line 327, terminal 325, diode 438, terminal 437, terminal 431 and line 429, so turning transistor 256 off and dropping away the pressure roller. Again, the splice detector is enabled, but the END OF ERASE STOP function simply acts first.

There is provision for a refinement of this ERASE function. It will be appreciated that in the circuit as described, the READY lamp will go on again once the ERASE process has been completed and the pressure roller dropped away. Thus the condition of the READY lamp leaves it uncertain as to whether the cartridge has in fact already been erased or whether it has just been inserted, awaiting erasure. To overcome this uncertainty, the refinement provides that the READY lamp stays off after the erasure and the release of the pressure roller. To this end, terminals 428 and 291 are strapped together and teh optional line 287 containing diode 288 is strapped. When the cartridge is initially inserted to close switch 146 to ground line 220 (FIG. 7E) the READY lamp is lighted, as before, base drive for transistor 278 being provided from terminal 266 through resistor 280, terminal 281, resistor 283, and resistor 284. Again, as described before, when the START button is pushed the ERASE lamp is turned off by virtue of grounding the base drive for transistor 278 from terminal 281 to terminal 285, diode 296, terminal 299 and through transistor 256.

When transistor 256 is shut off at the end of the ERASE operation, transistor 278 remains off by virtue of grounding the base, thereof; this time through terminal 281, terminal 285, line 287, diode 288, terminal 291, terminal 428 and the END OF ERASE STOP line 429. Again, it will be recalled that lines 294 and 196 will be absent.

For the combination ERASE and SPLICE FIND function, again referring to FIG. 7E, terminal 437 and 439 will be strapped together and terminals 428 and 291 and 431 and 437 will be respectively opened. Line 223 will be strapped. In this configuration, the eraser ramp control section and the transistors 228 and 242 will be empowered by voltage at terminal 225 through the strap line 223. The END OF ERASE stop line 429 is now disconnected from the control logic section by virtue of the open strappable terminals 428 and 431, so, at the timing out of timer 407 in the eraser ramp control section, the splice detector section is enabled and follows its normal course.

For splice find only, the circuit is the same as with the BOTH function, just described, except that line 223 is open. Under this circumstance no power is delivered to the eraser ramp control, transistor 435 (FIG. 7B) is therefore off, so enabling immediately the splice detector (subject to the momentary disabling through capacitor 316), and splice-detection and pressure-roller-drop-out follows in the normal fashion.

Some additional features should be noted in this invention. The high speed of transport, roughly four times that of normal playback speed, not only accelerates the splice finding process; it plays a further desirable function. It occasionally will happen that the free loop 60 of the tape will escape the erase field as the erase field is extinguished, leaving a very small trace of 60 cycle hum. Since playback, however, is at a quarter this speed, the hum will appear as 15 Hz, safely infrasonic.

The first form of splice detector, that illustrated in FIGS. 1 through 3, by being separate from and independent of the driving mechanism of the tape, may and does have an exceedingly low mass and low inertia, and thus be highly and instantly responsive to the passage of a splice. Although a pivotable lever is shown as exemplifying this aspect of the invention, it will be understood that a resilient lever, anchored at one end and contacting the flap 124 at its other end and having a feeler between its ends engaging the tape against the pinch roller could be substituted for the lever. Thus, instead of a pivoting action, a flexural action would result from splice detection for transmittal to the flap 124.

Other means than the described eraser ramp control circuit could be employed for providing the steadily increasing resistance 330 for ramp down than the illustrated LDR, including electromechanical means such as a clock timer for instance, but the described circuit provides certainly for the desired full-erase period and subsequent ramp down automatically upon the push of the START button.

It will be understood that embodiments only of the invention have been described above and that many alternatives or variations in the practice of the invention will be evident to those skilled in the art. We therefore desire that this invention be regarded as being limited only as set forth in the following claims.

The embodiments of the invention in which an exclusive property or privilege is claimed are defined as follows:

1. Apparatus for finding a splice in recording tape and the like characterized by the presence of a segment of splicing tape on a running length of said recording tape, comprising a driving roller, a rotatable pressure roller, means for holding one of said rollers against the other to pinch an increment of said recording tape between said rollers for driving engagement, means for moving said one roller away from the other, and other means adapted to engage said tape against the periphery of one of said rollers at a point spaced from the mutual engagement of said rollers with said tape to detect the additional thickness of said tape incident to the presence of said segment of splicing tape, and means responsive to the displacement of said other means operable to move said one roller away from pinching engagement with said other roller.

2. The combination as set forth in claim 1 wherein said responsive means includes a current-carrying coil, and the displacement of said other means modulates the reluctance of said coil to vary the current therein.

3. The combination as set forth in claim 2 wherein said coils includes a core having a variable air gap therein and the displacement of said other means changes said air gap.

4. The combination as set forth in claim 1 including a lever having a fulcrum, a short arm carrying said other means and a long arm adapted to actuate said responsive means.

5. The combination as set forth in claim 3 including a lever having a fulcrum, a short arm carrying said other means, and a long arm, said core being generally a D core with said coil being mounted on one leg thereof and another leg being pivotally mounted at one end to provide a variable air gap between it and the remainder of said core at its other end, said long arm engaging said pivotable leg to vary said air gap upon the passage of a splice past said other means.

6. Apparatus for finding a relatively abrupt change in the thickness of strip material comprising a pair of rollers for engaging diametrically opposite surfaces of said strip, one of said rollers being resiliently biased toward the other, a coil having a soft magnetic core therein, and a permanent magnet mounted to be movable with said one roller and having one pole thereof spaced closely adjacent one end of said core whereby a change in thickness of said strip material alters the distance between said pole and said core end to generate a current in said coil, and means responsive to said current for developing a signal.

7. Apparatus for finding a splice in recording tape and the like characterized by the presence of a segment of splicing tape on a running length of said recording tape, comprising a driving roller, a rotatable pressure roller, means for resiliently holding one of said rollers against the other to pinch an increment of said recording tape between said rollers for driving engagement, means for moving said one roller away from the other, a coil having a soft magnetic core therein, a permanent magnet mounted to move with said one roller and having one pole thereof spaced closely adjacent one end of said core when said one roller is in said pinching engagement whereby movement of said roller in response to the entry of a splice into said pinching engagement alters the spacing between said core and said pole to generate a current in said coil, and means responsive to said current operable to move said one roller away from pinching engagement with said other roller.

8. Apparatus for finding a splice in the tape of a recording tape cartridge of the type having an endless loop of tape therein conformed in a rotatable coil and a loose bight leaving the inside of said coil and returning to the outside thereof, said loop being comprised of a length of tape having the ends thereof spliced together by an overlapping segment of splicing tape, comprising a capstan for driving said tape, a pressure roller having a shaft, a cross shaft mounting said roller shaft pivotable to move said pressure roller toward said capstan to pinch an increment of said bight against said capstan and away therefrom, resilient means urging said roller away from said pinching engagement, a solenoid operative to bring said roller into said pinching engagement, means for energizing said solenoid, a permanent bar magnet mounted at one end to said cross shaft, a coil having a soft magnetic core therein mounted to situate one end of said core spaced closely adjacent the free end of said bar magnet when said roller is in said pinching engagement alters the space between said core end and magnet end to generate a current in said coil, and means responsive to said current to de-energize said solenoid.

9. The combination as set forth in claim 7 in which said means for resiliently holding one of said rollers against the other includes a solenoid having a plunger connected to said one roller and being effective when energized to press said one roller against said other roller, and an elastic member between said plunger and said one roller enabling said plunger to bottom when said solenoid is energized and enabling said spacing between the core and pole to be altered by entry of a splice without moving the plunger from its bottomed position.

* * * * *

UNITED STATES PATENT OFFICE
CERTIFICATE OF CORRECTION

Patent No. 4,221,316　　　　　　　Dated September 9, 1980

Inventor(s) John P. Jenkins and John Fesler

It is certified that error appears in the above-identified patent and that said Letters Patent are hereby corrected as shown below:

Column 8, line 48 - "224" should be -- 244 --.

Column 10, line 6 - "if off" should be -- is off --.

Column 11, line 1 - "288" should be -- 228 --.

Column 13, line 51 - "onn" should be -- on --.

Column 18, line 61 - "whould" should be -- should --.

Column 21, line 50 - after 523 delete the first "is placed".

Signed and Sealed this

Third Day of February 1981

[SEAL]

Attest:

RENE D. TEGTMEYER

*Attesting Officer*　　*Acting Commissioner of Patents and Trademarks*